US005212143A

United States Patent [19]
Torobin

[11] Patent Number: 5,212,143
[45] Date of Patent: May 18, 1993

[54] HOLLOW POROUS MICROSPHERES MADE FROM DISPERSED PARTICLE COMPOSITIONS

[76] Inventor: Leonard B. Torobin, 3340 Peachtree Rd. NE., Atlanta, Ga. 30026

[21] Appl. No.: 197,141

[22] Filed: May 5, 1988

Related U.S. Application Data

[60] Division of Ser. No. 889,927, Jul. 28, 1986, Pat. No. 4,777,154, which is a division of Ser. No. 639,126, Aug. 9, 1984, Pat. No. 4,671,909, which is a continuation-in-part of Ser. No. 428,923, Sep. 30, 1982, Pat. No. 4,548,196, which is a continuation of Ser. No. 103,113, Dec. 13, 1979, abandoned, which is a division of Ser. No. 59,296, Jul. 20, 1979, abandoned, which is a continuation-in-part of Ser. No. 937,123, Aug. 28, 1978, abandoned, and a continuation-in-part of Ser. No. 944,643, Sep. 21, 1978, abandoned.

[51] Int. Cl.$^5$ .................. B01J 20/08; B01J 20/28; B32B 1/06
[52] U.S. Cl. .................. 502/415; 65/21.4; 264/43; 264/129; 264/131; 428/402; 428/24; 435/240.22; 501/84; 502/400; 502/527; 521/56; 521/919
[58] Field of Search .................. 428/402.24; 65/21.4; 264/43, 129, 131; 501/84; 521/56, 919; 502/41.5

[56] References Cited

U.S. PATENT DOCUMENTS

| | | | |
|---|---|---|---|
| 3,177,161 | 4/1965 | Smith-Johannsen | 264/43 X |
| 3,264,073 | 8/1966 | Schmitt | 75/248 |
| 3,423,489 | 1/1969 | Arens et al. | 264/4 |
| 3,528,809 | 9/1970 | Farnand | 419/5 |
| 3,674,461 | 7/1972 | Farnand | 75/0.5 R |
| 3,792,136 | 2/1974 | Schmitt | 264/44 |
| 3,954,678 | 5/1976 | Marquisee | 252/62.54 |
| 4,059,423 | 11/1977 | De Vos et al. | 65/21.4 |
| 4,111,713 | 9/1978 | Beck | 106/409 |
| 4,214,020 | 7/1980 | Ward et al. | 427/296 |
| 4,222,977 | 9/1980 | Dobo | 264/63 |
| 4,230,463 | 10/1980 | Henis et al. | 55/16 |
| 4,257,798 | 3/1981 | Hendricks et al. | 65/21.4 |
| 4,268,278 | 5/1981 | Dobo et al. | 55/16 |
| 4,279,632 | 7/1981 | Frosch et al. | 65/21.4 |
| 4,303,431 | 12/1981 | Torobin | 65/21.4 |
| 4,303,603 | 12/1981 | Torobin | 264/69 |
| 4,303,732 | 12/1981 | Torobin | 428/333 |
| 4,303,736 | 12/1981 | Torobin | 428/403 |
| 4,329,157 | 5/1982 | Dobo et al. | 55/16 |
| 4,344,787 | 8/1982 | Beggs | 65/21.4 |
| 4,348,458 | 9/1982 | Otstot | 428/366 |
| 4,349,456 | 9/1982 | Sowman | 264/4 X |
| 4,415,512 | 11/1983 | Torobin | 264/9 |
| 4,671,909 | 6/1987 | Torobin | 264/43 |
| 4,744,831 | 5/1988 | Beck | 106/409 |

FOREIGN PATENT DOCUMENTS

WO86/01147  2/1986  PCT Int'l Appl.

OTHER PUBLICATIONS

Kirk–Othmer, Encyclopedia of Chemical Technology, Third Ed., 5, New York, John Wiley & Sons, p. 234 (1979).
Kirk–Othmer, Encyclopedia of Chemical Technology, Third Ed., 11, New York, John Wiley & sons, pp. 807, 813-817, 847-851 (1980).
Webster's New Collegiate Dictionary, Springfield, Mass., G. & C. Merriam Company, pp. 879, 1161 (1976).
Reedy, Journal of Applied Physics, vol. 47, No. 6, pp. 2502 to 2508, Jun. 1976.
Cutler, Lightweight Proppants For Deep Gas Well Stimulation, Terra Tek Engineering, TRE 82-18, Dec. 1983. Note: Previously provided in a parent application Ser. No. 639,126, filed Aug. 9, 1984.
R. P. Reedy, Selection and Measurement of Microsphere Laser Targets Based on Refraction, Journal of Applied Physics, vol. 47, No. 6, Jun. 1976.

*Primary Examiner*—Richard D. Lovering
*Attorney, Agent, or Firm*—Perry Carvellas

[57] ABSTRACT

Hollow porous microspheres of substantially uniform diameter and of substantially uniform wall thickness are disclosed. The walls of the hollow microspheres comprise sintered together particles which define interconnecting voids within the walls and a single central cavity in the interior of the microspheres and inner and outer microsphere wall surfaces. The interconnecting voids are continuous and extend from the outer wall surface to the inner wall surface. The walls have substantially uniform void content and the interconnecting voids are substantially uniformly distributed in the walls of the hollow microspheres and the walls of the hollow microspheres are free of latent solid or liquid blowing gas materials and are substantially free of relatively thinned wall portions and bubbles.

30 Claims, 6 Drawing Sheets

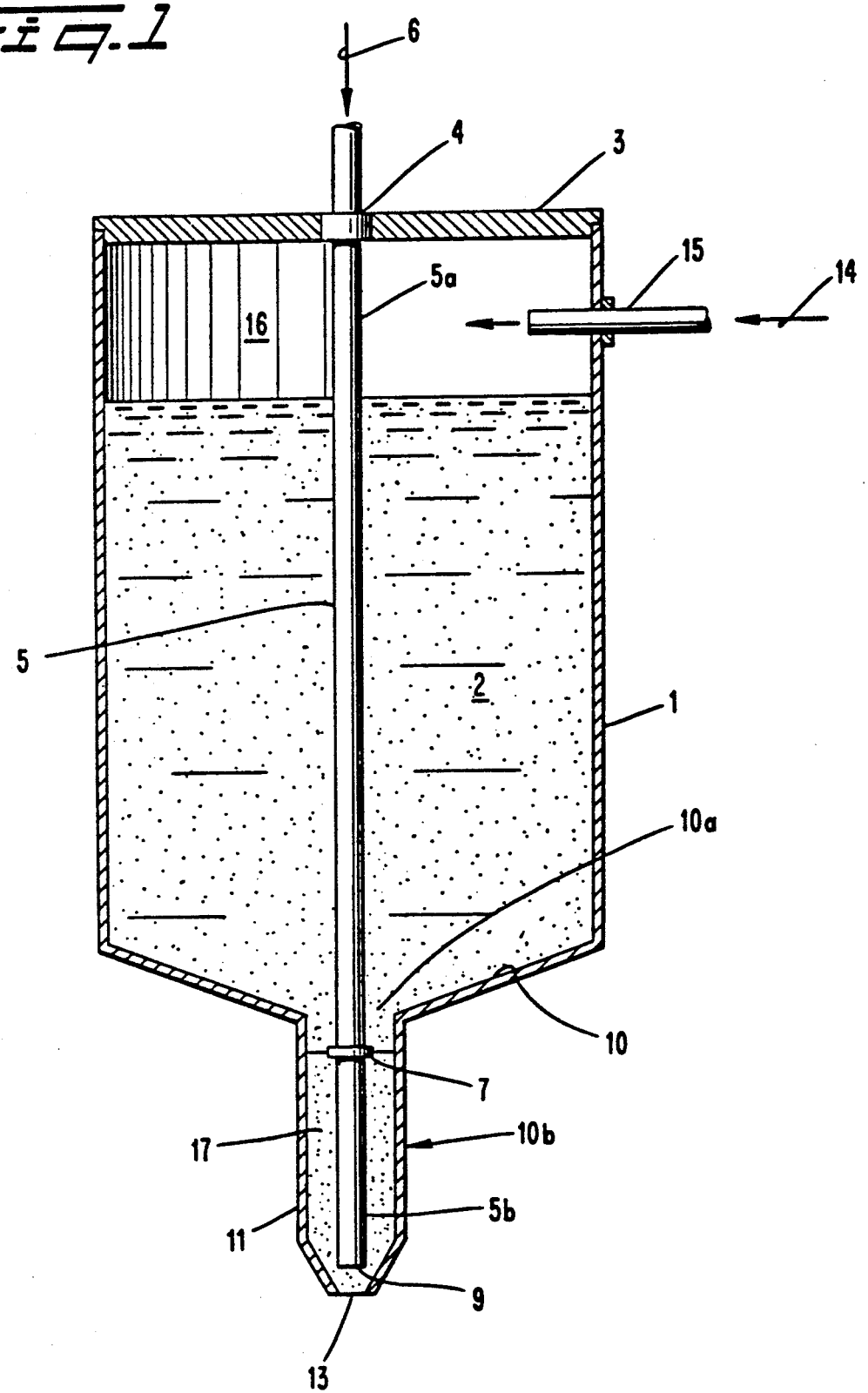

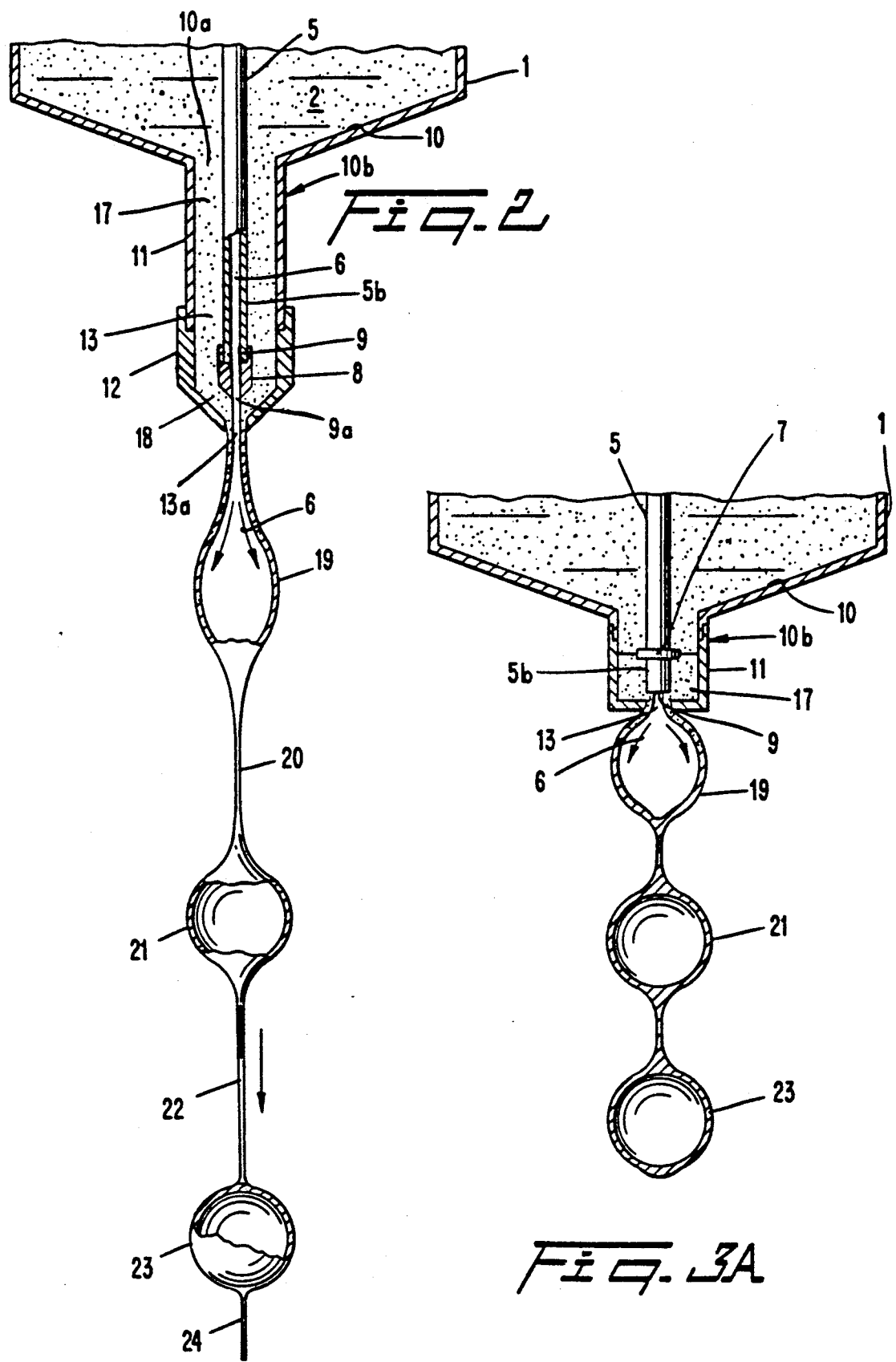

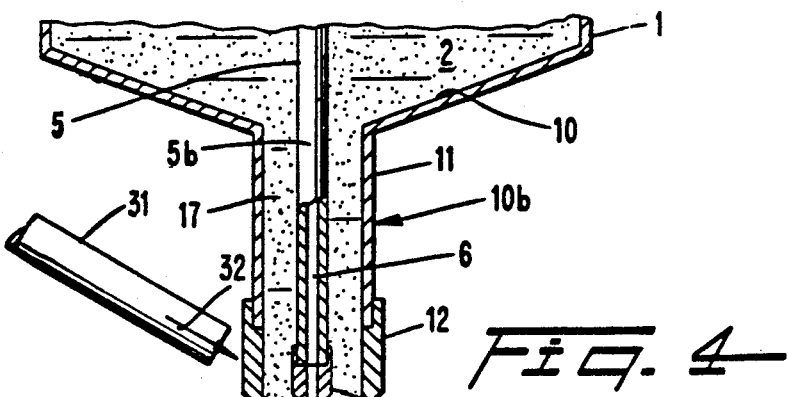
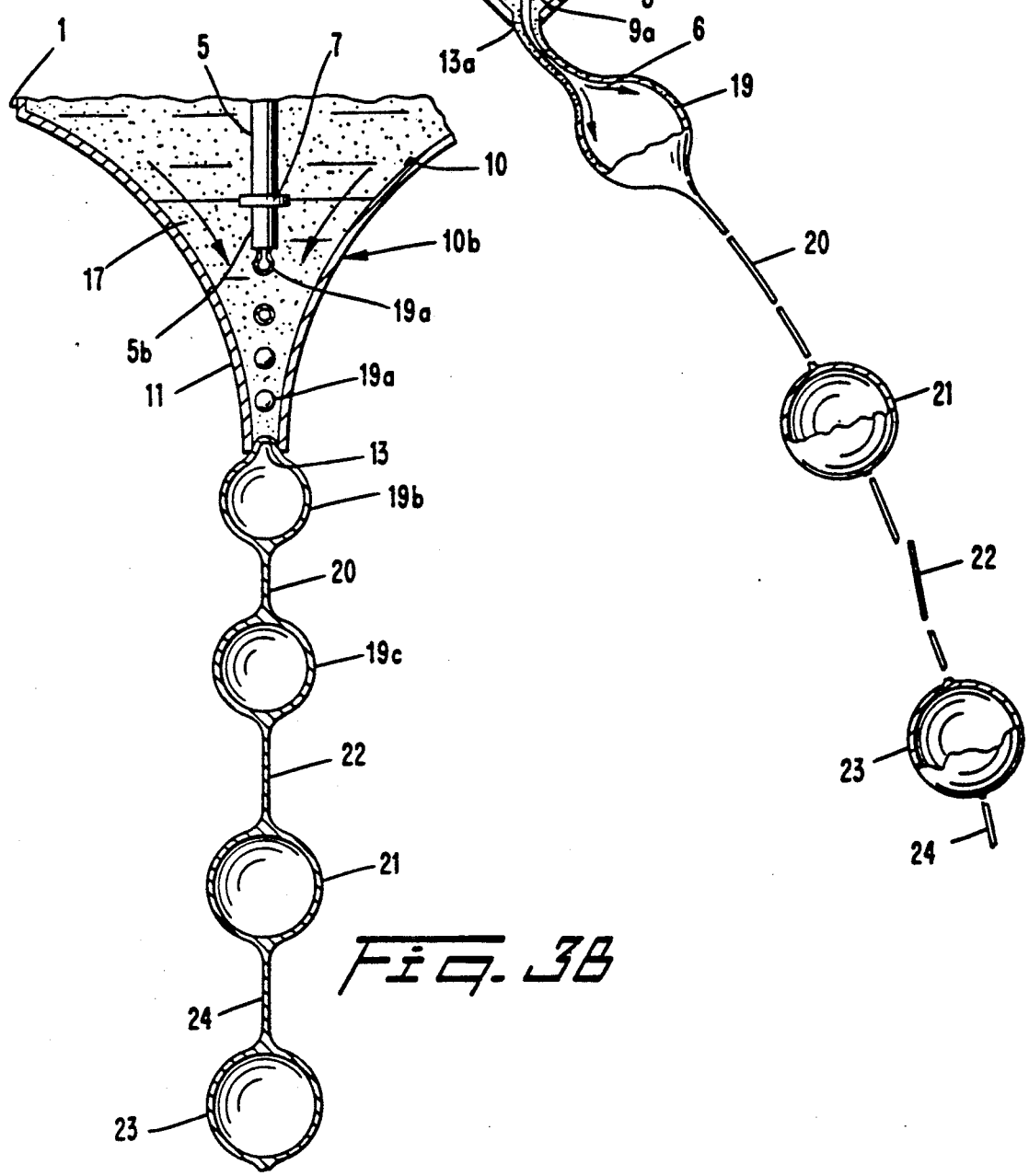

HOLLOW POROUS MICROSPHERES MADE FROM DISPERSED PARTICLE COMPOSITIONS

This application is a division application of Ser. No. 889,927 filed Jul. 28, 1986, now U.S. Pat. No. 4,777,154 which is a division application of Ser. No. 639,126 filed Aug. 9, 1984 (U.S. Pat. No. 4,671,909), which is a continuation-in-part of Ser. No. 428,923 filed Sep. 30, 1982 (U.S. Pat. No. 4,548,196), which is a continuation of Ser. No. 103,113 filed Dec. 13, 1979, abandoned, which is a division of Ser. No. 59,296 filed Jul. 20, 1979, abandoned, which is a continuation-in-part of Ser. No. 937,123 filed Aug. 28, 1978, abandoned, and a continuation-in-part of Ser. No. 944,643 filed Sep. 21, 1978, abandoned.

SUMMARY OF THE INVENTION

The present invention relates to hollow microspheres made from dispersed particle film forming compositions comprising dispersed particles, binder, film stabilizing agent, dispersing agent and continuous liquid phase.

The present invention particularly relates to hollow green microspheres made from dispersed particle film forming compositions comprising dispersed solid particles, a binder material, a film stabilizing agent, a dispersing agent for the solid particles and a continuous aqueous or non-aqueous liquid phase.

The present invention particularly relates to hollow green microspheres made from dispersed particle film forming compositions which hollow green microspheres are substantially spherical, have substantially uniform diameters and have substantially uniform wall thickness. The hollow green microspheres are free of latent solid or liquid blowing gas materials, and the walls of the hollow green microspheres are substantially free of holes, relatively thinned wall portions or sections and bubbles.

The present invention particularly relates to rigid hollow porous microspheres which are substantially spherical, have substantially uniform diameters, and have substantially uniform wall thickness and the walls have uniform void content and void distribution and voids which are connected to each other and to the inner and outer microsphere wall surfaces. The walls of the hollow porous microspheres are free of latent solid or liquid blowing gas materials, and are substantially free of relatively thinned wall portions or sections and bubbles.

The hollow green microspheres can be made from ceramic, glass, metal, metal glass and plastic particles, and mixtures thereof.

The present invention relates to a method and apparatus for using a coaxial blowing nozzle and a blowing gas to blow hollow microspheres from a dispersed particle film forming composition comprising feeding the blowing gas to an inner coaxial nozzle, feeding the dispersed particle film forming composition to an outer coaxial nozzle, forming spherically shaped hollow microspheres in the region of the orifice of the coaxial blowing nozzle and removing the hollow microspheres from the region of the orifice of the coaxial blowing nozzle.

The present invention more particularly relates to a method and apparatus for using a coaxial blowing nozzle and an external fluctuating pressure field, e.g., a transverse jet entraining fluid and a blowing gas to blow hollow microspheres from a dispersed particle film forming composition comprising applying the blowing gas to the inner surface of the film forming composition to continuously blow individual spherically shaped hollow microspheres and using the transverse jet entraining fluid to assist in the microsphere formation and the detaching of the hollow microspheres from the blowing nozzle.

The continuous liquid phase of the dispersed particle film forming composition allows the hollow microspheres to be blown by forming a stable film to contain the blowing gas while the hollow microsphere is being blown and formed.

The dispersed particles in the dispersed particle composition, as the dispersed particle composition is forming the hollow microsphere and after the microsphere is formed, link up with each other to form a rigid or relatively rigid lattice work of disersed particles which dispersed particle lattice work with the binder and continuous liquid phase comprise the hollow green microspheres.

The hollow microspheres after they are formed can be hardened in ambient atmosphere or by heating and removing a portion of the continuous phase or by cooling where a thermoplastic binder is used. Where a photo or ionizing radiation polymerizable binder is used, the hollow microspheres can be subjected to ultraviolet light or ionizing radiation to rapidly polymerize the binder and harden the microspheres. The hardened hollow green microspheres have sufficient strength for handling and further treatment without significant breaking or deforming of the microspheres.

The hardened green microspheres are treated at elevated temperatures to remove the remainder of the continuous liquid phase and volatile materials such as binder, film stabilizing agent and dispersing agent. The treatment at elevated temperatures sinters and coalesces the dispersed solid particles to form rigid hollow porous microspheres that are substantially spherical in shape, have substantially uniform diameters and have substantially uniform wall thickness. The heating at elevated temperatures, in removing the continuous phase and added materials, creates interconnecting voids in the walls of the microspheres which result in the porous characteristics of the microspheres. The sintering and coalescing of the dispersed solid particles, depending on the time and temperature of the heating step can cause a small degree of compaction of the dispersed particles and can cause the coalescing of the particles at the points in which they are in contact to form rigid, uniform size and shaped microspheres of uniform wall thickness, uniform void content and uniform distribution of voids in the walls and high strength. Because the porosity is a result of the removal of the continuous phase from uniformally dispersed solid particles, the pores are continuous from the outer wall surface of the microsphere to the inner wall surface of the microsphere and the walls of the microspheres have substantially uniform void content and uniform distribution of the voids that are created.

The rigid hollow porous microspheres of the present invention can be treated to impregnate the pores or place within the pores semipermeable membranes and the thus treated microspheres can be used in selective gas or selective liquid separation processes. The porous microspheres may also be treated to act as a substrate for or to contain a catalyst and be used for carrying out chemical processes.

The rigid hollow porous microspheres of the present invention can be treated to encapsulate within the microspheres genetically engineered or natural living microorganisms. The microspheres containing the living organisms can be treated with nontoxic semipermeable membranes to seal the microsphere pores. The semipermeable membrane can selectively allow passage of nutrients and oxygen into the hollow microspheres and allow passage of biologically produced products and/or waste products out of the hollow microspheres. The hollow porous microspheres may accordingly be used in conjunction with genetically engineered bacteria or other living microorganisms, antibiotics or enzymes in processes to produce or separate and purify pharmaceutical or chemical products.

The rigid hollow porous microspheres of the present invention can be employed to encapsulate liquids or gels which are caused to be deposited into the internal hollow cavity of the microspheres by hydrostatic pressure or by centrifugal force. The liquids or gels can subsequently be used as adsorbents, absorbents or catalysts, or as slow release chemical agents. An outer membrane film may be added to control the selectivity of the process and thereby, for example, combine the processes of membrane separation and adsorption, absorption or affinity chromatography. The outer membrane can also be used to protect a catalyst from contamination.

BACKGROUND OF THE INVENTION

In recent years, there has developed many uses for hollow microspheres of uniform diameter, uniform wall thickness and uniform strength. Hollow microspheres have found industrial uses as filler materials and as proppants to increase gas recovery from gas wells. Though there are known methods for producing hollow microspheres the known methods suffer one or more shortcomings including producing very small microspheres, microspheres of random size distribution, microspheres which contain latent liquid, solid or gas blowing agents, and microspheres which have thin wall sections or walls having small gas bubbles dissolved or trapped in the walls. See, for example, Sowman U.S. Pat. No. 4,349,456 (sol gel process), and De Vos et. al. U.S. Pat. No. 4,059,423 (latent blowing gas process). Other methods that avoid these shortcomings generally involve carrying out the microsphere forming step at high or relatively high temperatures. See, for example, L. B. Torobin U.S. Pat. No. 4,303,431 (glass), U.S. Pat. No. 4,303,603 (plastic), and U.S. Pat. No. 4,415,512 (metal).

Prior to the time applicant made the present invention there was no known simple economical method of producing relatively large hollow microspheres or hollow porous microspheres where the microspheres were substantially spherical, of substantially uniform diameter, uniform wall thickness, uniform void content and uniform void distribution and intercommunication of the voids in the walls and uniform strength and where the microspheres could be produced at about ambient temperatures.

Further, the recently developed processes which use a multiplicity of hollow porous glass or porous plastic tubes coated with semipermeable membranes for carrying out selective gas or liquid separation processes suffer several shortcomings. The porous glass and plastic tubes are joined by headers which are difficult to manufacture and seal, and the glass tubes in use frequently break. The processes using plastic tubes are limited in operating temperatures and pressures due to the tendency of the tubes to creep and/or buckle with increasing temperatures. Also, attempts to make hollow glass tubes with interconnected voids in the tube walls by acid etching of a separated glass phase has resulted in excessively weak glass tube walls.

In addition, the recently developed use of bioengineered microbacteria to produce pharmaceutical and chemical products has been hampered by the absence of a large scale process in which a self-sustaining sterile growth environment for the bacteria could be maintained, which at the same time allowed selective permeation of oxygen and nutrients to the bacteria, and selective removal of the waste products and/or bio produced products from the sterile environment. Though numerous pharmaceutical and chemical products have been produced in the laboratory or by small scale in vivo processes there has not been an economical means developed which would allow general large scale handling and processing of the bacteria and sterile environment and the efficient separation and purification of bioproducts produced.

OBJECTS OF THE INVENTION

It is an object of the present invention to provide a process and apparatus for making hollow microspheres from a dispersed particle film forming composition at about ambient or relatively low temperatures using a coaxial blowing nozzle and a blowing gas.

It is another object of the present invention to make hollow green microspheres from a dispersed particle film forming composition comprising dispersed solid particles, a binder material, a film stabilizing agent, a dispersing agent for the solid particles and a continuous aqueous or non-aqueous liquid phase.

It is another object of the present invention to make hollow green microspheres from a dispersed particle film forming composition comprising dispersed ceramic particles, glass particles, metal particles, metal glass particles or plastic particles, and mixtures thereof.

It is another object of the present invention to use a coaxial blowing nozzle to blow a dispersed particle film forming composition to form hollow green microspheres which are spherical in shape, have uniform diameters and uniform thin walls, which walls are substantially free of trapped gas bubbles or dissolved latent blowing gases which can form bubbles and/or escape to form holes.

It is still another object of the present invention to produce from dispersed particle compositions in an economical simple manner hollow porous microspheres which are substantially spherical in shape, uniform in size, wall thickness and have uniform and prescribed void content and uniform void distribution in the walls and which have substantially uniform strength.

It is still another object of the present invention to produce from dispersed particle compositions hollow microspheres which have been treated to seal the pores or to fuse the dispersed particles to substantially close off the pores and remove the voids.

It is another object of the present invention to make rigid hollow porous and rigid non-porous microspheres for use as filler materials and proppants.

It is another object of the present invention to make rigid hollow porous microspheres suitable for use as substrates for semipermeable membranes in processes for carrying out gas and liquid separations and for use as substrates for catalyst and enzymes.

It is another object of the present invention to make rigid hollow porous microspheres suitable for use as substrates for semipermeable membranes in processes for the manufacture and purification of pharmaceutical of chemical products using or derived from genetically engineered bacteria, natural living microorganisms and enzymes.

It is another object of the present invention to make rigid hollow porous microspheres suitable as containers for liquids, adsorbents, absorbents or catalyst, or as containers for chemical agents whose release is subject to predetermined control, e.g., controlled slow release.

BRIEF DESCRIPTION OF THE DRAWINGS

The attached drawings and photographs illustrate exemplary forms of the method and apparatus of the present invention for making hollow microspheres from a disperse particle film forming composition and illustrate some of the hollow microspheres that are obtained.

The FIG. 1 of the drawings shows in cross-section an apparatus having a coaxial blowing nozzle means for supplying the dispersed particle composition material from which the hollow porous microspheres are formed and for supplying the gaseous material for blowing the hollow microspheres.

The FIG. 2 of the drawings is a detailed cross-section of a coaxial nozzle construction and shows the formation of filamented hollow microspheres.

The FIG. 3A of the drawings is a cross-section of a modified coaxial nozzle construction and shows the formation of filamented hollow microspheres.

FIG. 3B of the drawings is a cross-section of a coaxial nozzle construction and shows an embodiment of the invention in which small gas bubbles are formed in the continuous liquid phase prior to blowing the hollow microspheres.

The FIG. 4 of the drawings is a cross-section of a coaxial nozzle construction of FIG. 2 used in conjunction with a transverse jet to assist in the formation and detachment of the hollow microspheres from the coaxial nozzle and shows the formation of filamented microspheres and the breaking away of the filaments from the microspheres caused by the lateral fluctuations of the filaments induced by the transverse jet entraining fluid.

Figure 5A:
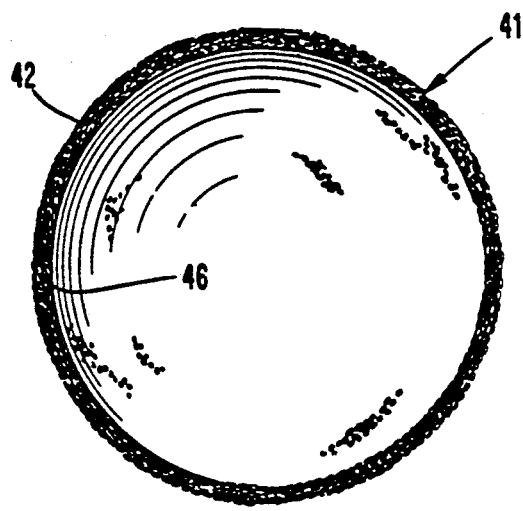

The FIG. 5A of the drawings is an enlarged cross-section of a hollow porous microsphere made from the dispersed particle compositions of the present invention and showing the interconnecting voids.

Figure 5B:
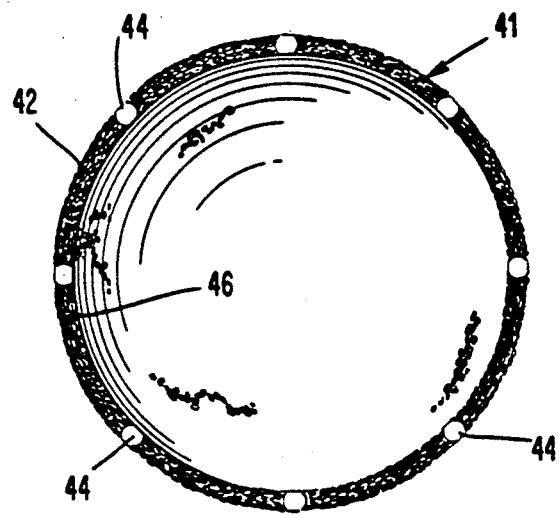

The FIG. 5B of the drawings is an enlarged cross-section of a hollow porous microsphere of the present invention showing large or macro pores which extend through the walls and which are evenly distributed in the walls of the microsphere.

Figure 5C:
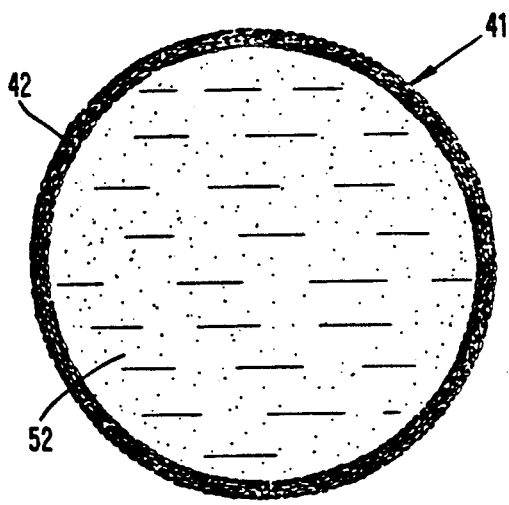

The FIG. 5C is a cross-section of the microsphere section illustrated in FIG. 5A in which the inner volume of the hollow microsphere has been filled with a catalyst material, or a liquid adsorbent or absorbent material.

Figure 5D:
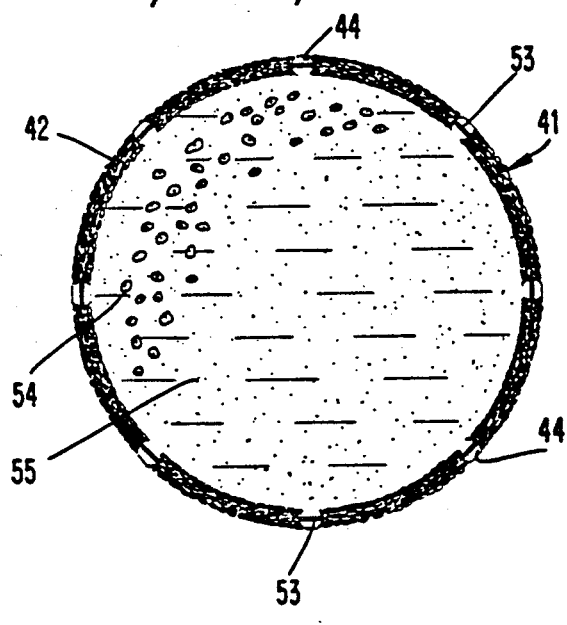

The FIG. 5D is a cross-section of the microsphere section illustrated in FIG. 5B in which the inner volume of the hollow microsphere has been filled with living cell microorganisms in a nutrient broth and the macro pores sealed with a semipermeable membrane.

Figure 6A:
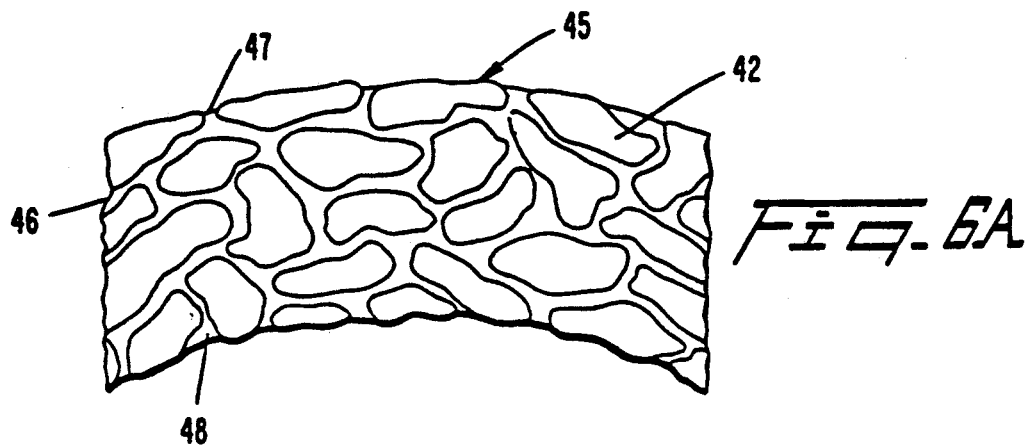

The FIG. 6A is an enlarged cross-section of a hollow microsphere made from the dispersed particle compositions of the present invention which has been heated at elevated temperature to remove the binder and continuous phase and sinter the dispersed particles.

Figure 6B:
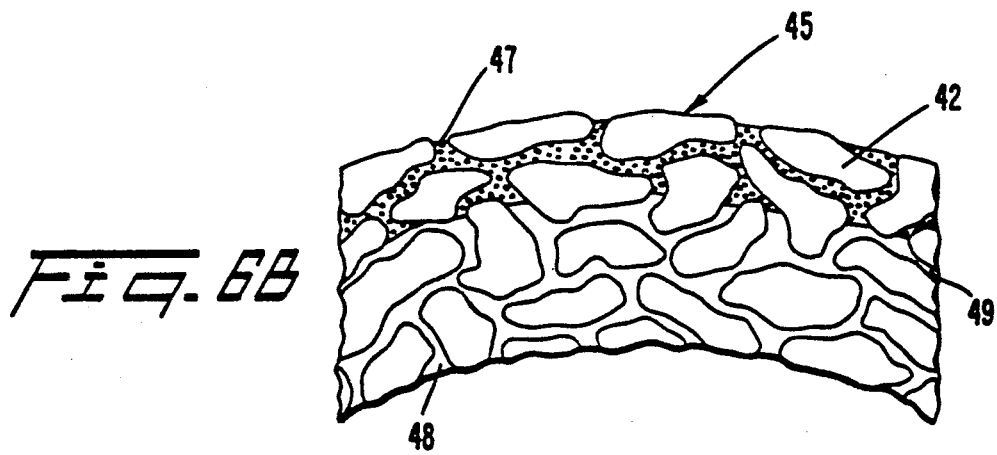

The FIG. 6B is another cross-section of the microsphere section illustrated in FIG. 6A which has been treated with a sol composition and again heated at elevated temperature to deposit solid particles from the sol composition which form a lattice work of the particles in the microsphere wall pores to reduce the pore size, i.e., to produce micro pores, which micro pores can provide support for a semipermeable membrane to be deposited on, impregnated or placed in the micro pores.

The FIG. 6C is another cross-section of the microsphere section illustrated in FIG. 6A in which the pores in the wall of the hollow microsphere have been sealed with a semipermeable polymeric or immobilized liquid membrane.

The FIG. 7A is a photograph of an embodiment of the invention illustrated in FIG. 4 in which substantially spherical hollow green microspheres are obtained using a transverse jet entraining fluid and shows the breaking away of the filaments connecting the microspheres.

The FIG. 7B is a photograph of an embodiment of the invention illustrated in FIG. 2 in which filamented hollow green microspheres are obtained.

The FIG. 7C is a photograph of another embodiment of the invention illustrated in FIG. 2 in which non-filamented hollow green microspheres are obtained.

THE ADVANTAGES

The present invention overcomes many of the problems associated with prior attempts to produce hollow green microspheres and to produce hollow porous microspheres from dispersed particle compositions. The process and apparatus of the present invention allows the production of hollow green microspheres and rigid hollow porous microspheres having predetermined characteristics of uniform diameter, uniform wall thickness and uniform void content, uniform void distribution and void intercommunication in the walls and high strength such that hollow porous microspheres can be designed, manufactured and tailor made to suit a particular desired use. The diameter, wall thickness, void content, void distribution and void intercommunication in the walls, strength and chemical properties of the hollow porous microspheres can be determined by carefully selecting the constituents of the dispersed particle composition, particularly the dispersed solid particles, the size of the dispersed solid particles and the volume percent solids of the dispersed particle, i.e., liquid/solids, composition, and the elevated temperature at which the hollow green microspheres are fired and sintered to remove the continuous phase.

The diameter and wall thickness of the hollow microspheres are determined primarily by the geometry of the nozzle components and by the viscosity of the dispersed particle composition, the blowing gas pressure, and where used the linear velocity of the transverse jet entraining fluid. The porosity and degree of intercommunication of the voids in the microspheres walls is determined primarily by the volume percent solid particles in the dispersed particle composition and the degree of sintering. The process and apparatus of the present invention allow a wide range of selection of dispersed particles to form the composition and a wide range of selection of the blowing gas to blow the hollow microspheres.

The process and apparatus of the present invention provide a practical and economical means by which hollow green microspheres and hollow porous microspheres having uniform diameters and uniform thin walls of high strength can be produced. The process and apparatus of the present invention provide for the production of hollow green microspheres and hollow porous microspheres at economic prices and in large quantities.

The process and apparatus of the present invention, as compared to the prior art process (De Vos U.S. Pat. No. 4,059,423) using a latent liquid or solid blowing agent, produces uniform size spheres as compared to spheres of random size distribution, and produces spheres the walls of which are of uniform thickness, are free of thin walled portions, trapped bubbles or gases, or trapped latent blowing agents which weaken the walls, or which may subsequently escape and leave holes in the walls.

The process and apparatus of the present invention, as compared to the prior art sol gel microcapsule process (Sowman U.S. Pat. No. 4,349,456), produces large uniform size spheres with uniform thin walls. The Sowman sol gel process produces small spheres of random size distribution and spheres which have thin and weakened wall portions.

DISCUSSION OF THE INVENTION

The invention will be described with reference to the accompanying Figures of the drawings wherein like numbers designate like parts throughout the several views.

Referring to FIGS. 1 and 2 of the drawings there is illustrated a vessel 1, made of suitable non-corrosive material capable of being heated, by means not shown, and containing stirring or mixing means, also not shown, capable of maintaining the solid particles in the dispersed particle film forming composition 2 evenly dispersed throughout the continuous liquid phase of the composition in vessel 1.

The vessel 1 contains a removable lid 3 which may be removed to fill vessel 1 with a charge of dispersed particle composition 2. The lid 3 contains a centered opening 4 through which a vertically moveable upper portion 5a of hollow tube 5 passes. The lower portion of hollow tube 5 forms the inner concentric blowing nozzle 5b for the blowing gas 6. The inner concentric blowing nozzle 5b, passes through and is centered by centering means 7.

The lower portion of inner coaxial nozzle 5b of the hollow tube 5 can have removeably connected thereto a calibrated nozzle 8 such that inner concentric nozzle 5b may have the inside diameter of orifice opening 9 changed to 9a.

The bottom floor 10 of vessel 1 contains vertically disposed outer coaxial nozzle 11, which communicates with the inside of vessel 1 through opening 10a in the floor 10 of vessel 1.

The centering means 7 is connected to the inner wall surface of outer coaxial nozzle 11 and serves to center the inner coaxial nozzle 5b in outer coaxial nozzle 11.

The lower portion of outer nozzle coaxial 11 can have removeably connected thereto a calibrated nozzle 12 such that outer coaxial nozzle 11 may have the inside diameter of orifice opening 13 changed to 13a.

The blowing gas 6 is fed to vessel 1 through hollow tube 5. A positive pressure can be applied to dispersed particle composition 2 by feeding a pressurizing gas 14 through conduit 15 into vessel 1 in the area 16 above dispersed particle composition 2. The outer coaxial nozzle 11 can be formed by a downward extension of the bottom 10 of vessel 1 or can be formed separately, as shown in FIG. 3A, and suitably connected to the bottom of vessel 1.

The blowing nozzle 10b consists of an inner nozzle 5b having an orifice 9 or 9a, for a blowing gas, and an outer nozzle 11 having an orifice 13 or 13a for the dispersed particle composition. The inner nozzle 5b is disposed and centered within and coaxial to outer nozzle 11 to form annular space 17 between nozzles 5b and 11, which annular space provides a flow path for dispersed particle composition 2.

The orifice 9 or 9a can terminate a short distance above the plan of orifice 13 or 13a, respectively of outer nozzle 11. The cross section of annular space 17 of coaxial nozzle 10b is sufficiently large such that the particles in dispersed particle composition 2 flow freely through the annular space 17 without agglomerating or plugging.

The dispersed particle composition 2, at about atmospheric pressure or at an elevated pressure applied by introducing gas 14 to area 16 above dispersed particle composition 2 in vessel 1, flows downwardly through annular space 17 and fills the area between orifice 9 and 13, or 9a and 13a. The surface tension forces in the dispersed particle composition form a thin liquid film 18 across orifice 9 and 13 or 9a and 13a.

A blowing gas 6 at about the temperature of the dispersed particle composition 2 and at a pressure slightly above the dispersed particle composition pressure at the blowing nozzle, is fed through hollow tube 5 and inner coaxial nozzle 5b and brought into contact with the inner surface of the film 18 of dispersed particle composition 2. The blowing gas 6 exerts a positive pressure on the dispersed particle composition film to blow and distend the film outwardly to form an elongated cylinder shaped liquid film 19 of dispersed particle composition filled with the blowing gas 6.

The elongated cylinder initially is closed at its outer end and is connected at its inner end to outer nozzle 11 or 12, at the peripheral edge of orifice 13 or 13a.

The continued feeding of dispersed particle composition 2 and blowing gas 6 to the coaxial nozzle 10b forms alternatively filaments 20, 22 and 24 and microspheres 21 and 23, respectively.

A balancing pressure of a gas, i.e., a slightly lower pressure, is provided in the area of the blowing nozzle 10b into which the elongated cylinder shaped 19 dispersed particle composition liquid film is blown. The illustrated coaxial nozzle can be used to produce hollow microspheres having diameters up to three to five times the size of the inside diameter of orifice 13 or 13a.

The tapered nozzle apparatus illustrated in FIGS. 1, 2, 3A and 4 allows the use of larger inner diameters of outer nozzle 11 and larger inner diameters of inner nozzle 5a, both of which reduce the possibility of plugging of the coaxial nozzle 10b when in use. The use of a larger inner diameter of outer nozzle 11 is of particular advantage when the dispersed particle composition contains relatively large dispersed solid particles and/or when the dispersed particle composition has a relatively high or high viscosity.

FIG. 3A illustrates an embodiment of the invention in which outer coaxial nozzle 11 is removeably connected to the floor 10 of vessel 1 such that orifice 13 may be in the form of a circular die and dies of various diameters may be interchanged and used. The inner hollow tube 5, the lower portion of which forms inner coaxial nozzle 5b is moveable vertically and is removable and hollow tubes 5 having different inside diameters of orifice 9 and different outside diameters may be used. The inner coaxial nozzle 5b, as before is centered by centering means 7. The FIG. 3A embodiment also provides a means by which the cross section area of annual space 17 may be increased or decreased independently of the size of orifice 13 in outer nozzle 11. In FIG. 3A the dispersed particle composition 2 is fed through annular space 17 and blown by blowing gas 6 to form elongated cylinder 19, forming microsphere 21 and microsphere 23, respectively.

The FIG. 3A embodiment provides an apparatus in which the plane of the orifice 9 of inner nozzle 5b can be adjusted to be above, at the same level or below the plane of the orifice 13 of outer nozzle 11. By the selection of a desired outer diameter of inner nozzle 5a and an inner diameter of orifice 13 the gap, i.e., the distance between the outer diameter of the nozzle 5a and the inner diameter of the inner nozzle 11, through which the dispersed particle composition 2 flows can be preselected. The gap in this case can be used to determine the forming microsphere, i.e., the elongated cylinder 19, film thickness and the microsphere wall thickness.

FIG. 3B illustrates an embodiment of the apparatus of the invention in which the plane of the orifice 9 of inner nozzle 5b can be adjusted to be substantially above the plane of the orifice 13 of outer nozzle 11. The dispersed particle composition 2 is as before fed and moves downwardly through annular space 17.

By partially restricting the size of orifice 13, controlling the viscosity of dispersed particle composition 2 and by maintaining a positive pressure on the dispersed particle composition 2 and maintaining a slightly higher positive pressure on blowing gas 6 small evenly spaced apart gas filled bubbles 19a can be formed in the continuous liquid phase of dispersed particle composition 2 in the outer coaxial nozzle 11.

The bubbles 19a as they leave orifice 13 are carried downwardly by the downwardly moving dispersed particle composition 2. Because the gas bubbles 19a are under positive pressure while within outer coaxial nozzle 11, the bubbles at 19b and 19c expand as they leave orifice 13 until the internal gas pressure in the bubbles reach equilibrium with the ambient atmosphere pressure as shown at microspheres 21 and 23. The expanding bubbles 19b and 19c are connected by filament 20 and expanding bubble 19c is connected to hollow microsphere 21 by filament 22, and microspheres 21 and 23 are connected by filament 24.

FIG. 4 of the drawings illustrates another embodiment of the invention in which a transverse jet 31 is used to direct an inert entraining fluid 32 which is at about the same temperature as the dispersed particle composition 2. The entraining fluid 32 is fed through transverse jet 31 and directed at the coaxial blowing nozzle 10b. The transverse jet 31 is aligned to direct the flow of entraining fluid 32 over and around the blowing nozzle 10b in the microsphere forming region at and behind orifice 13a. The entraining fluid 32 as it passes over and around blowing nozzle 10b fluid dynamically induces a pulsating or fluctuating pressure field in the entraining fluid 32 at the opposite or lee side of blowing nozzle 10b in its wake or shadow. The fluctuating pressure field induces regular periodic lateral oscillations of the cylinder and connecting filaments similar to those of a flag flapping in a breeze.

The entraining fluid 32 envelops and acts on the elongated cylinder 19 during its formation in such a manner as to cause the cylinder 19 to flap, fold, pinch and close off at its inner end at a point proximal to the orifice 13a of outer nozzle 11. The continued movement of the entraining fluid 32 over the elongated cylinder 19 produces fluid drag forces on the cylinder 19 and detaches it from the orifice 13a of the outer nozzle 12 to allow the cylinder to be entrained and transported away from outer nozzle 12. The surface tension forces of the dispersed particle composition 2 act on the entrained falling elongated cylinder 19 and cause the cylinder to seek a minimum surface area and to as the spheres move away from outer coaxial nozzle 12 to become more and more spherically shaped hollow dispersed particle composition microspheres 21 and 23. The lateral fluctuations of the connecting filaments induced by transverse jet entraining fluid act on the filaments to cause the filaments to break up.

The microspheres 21 and 23 as they are formed rapidly harden to form hollow green microspheres. The filaments 20 and 22 also rapidly harden and due to the induced fluctuating pressure field can be broken away from the microspheres 21 and 23 as illustrated in FIG. 4 and FIG. 7.

In the FIGS. 1 to 4 embodiments of the invention heating means (not shown) for removing a portion of the continuous phase or cooling means (not shown) where a thermosetting binder phase is used can be disposed below the coaxial blowing nozzle 10b to rapidly heat, remove continuous liquid phase and harden or to cool and harden the hollow microspheres. The hollow green microspheres can then be heated and fired at elevated temperatures to remove the continuous liquid phase and added binder, film stabilizing agent and dispersing agent and sinter the dispersed solid particles at the dispersed particles points of contact to form high strength, uniform diameter hollow microspheres of uniform wall thickness and uniform void content and uniform void distribution in the walls of the microspheres.

The dispersed sintered particles define interconnecting voids in the hollow microsphere walls which are continuous and extend from the outer wall surface to the inner wall surface of the hollow microsphere.

Additional cooling time or heating time, if necessary or desirable, can be provided by using a shot type tower, fluidized bed, an air cushion, a cushion of finely divided fluidized particles, liquid carrier or belt carrier system or combinations thereof for the hollow green microspheres to further harden the microspheres to make them easier to handle.

In the FIGS. 2 to 4 of the drawings the hollow microspheres are connected to each other by thin filaments. As can be seen in the drawings, as the microspheres progress away from coaxial nozzle 10b surface tension forces act on the forming hollow microspheres to effect the gradual change of the elongated shaped forming microsphere into the generally spherical shape microsphere 21 and more spherically shaped microsphere 23.

The same surface tension forces also cause a gradual reduction in the diameter of the connecting filaments 20, 22 and 24, as the distance between the microspheres and the blowing nozzle 10b increases. The hollow microspheres 21 and 23 are connected by thin filaments 20 and 22 which, as they progress away from the blowing nozzle 10b, become of substantially equal length and are continuous with the microspheres.

In the FIGS. 2, 3 and 3A embodiments the filaments are or can be broken away from the microspheres by use of external fluid jets or at such time as the microspheres are collected, e.g., on a fluidized bed or solid support.

FIG. 5A of the drawings is an enlarged cross section of a hollow porous microsphere 41 made in accordance with the present invention. The microsphere illustrated is shown after firing at elevated temperature and shows dispersed particles 42 and the interconnecting voids 46.

The FIG. 5B of the drawings is an enlarged cross section of a hollow porous microspheres 41 made in accordance with an embodiment of the invention showing dispersed particles 42 and interconnecting voids 46 and large uniform macro size pores 44 of a predetermined size. In order to obtain the desired size macro pores 44 there is added to the dispersed particle composition and distributed throughout the composition a small proportion of combustible, vaporizable or meltable macro particles. The combustible, vaporizable or meltable particles are selected so that they are burned, vaporize or melt at temperatures below the melting temperatures of the dispersed solid particles, but at temperatures above the blowing temperatures. The size of the combustible, vaporizable or meltable macro particles is selected such that they are about the same size or slightly larger in size than the wall thickness of the hollow microsphere being blown. In this embodiment when the hollow green microspheres are heated and fired at elevated temperatures to sinter the dispersed particles, the macro pores 44 are obtained which extend completely through the walls of the hollow microspheres.

The FIG. 5C is a cross-section of the microsphere section illustrated in FIG. 5A in which the inner volume of the hollow microsphere is filled with a catalyst material, or a liquid adsorbent or absorbent material 52.

The FIG. 5D is a cross-section of the microsphere section illustrated in FIG. 5B in which the inner volume of the hollow microsphere is filled with living cell microorganisms 54 in a nutrient broth 55 and the macro pores 44 are sealed with a semipermeable membrane 53.

The FIGS. 6A, B and C show an enlarged detailed cross section 45 of a hollow porous microsphere after it has been fired at an elevated temperature and after the continuous liquid phase has been removed. The firing is carried out at elevated temperature, but below the melting temperature of the dispersed particles 42 which become sintered together at their points of contact to form strong bonds and a strong uniformly thick microsphere wall. In firing at elevated temperatures the remaining continuous liquid phase and additive materials or agents are vaporized and leave pores 47 at the outer surface of the microsphere wall which pores extend by interconnecting voids 46 through the wall 45 of the microsphere to the inner wall surface pore 48 of the microsphere.

The FIG. 6B shows a detailed cross section of the wall of the hollow microsphere of FIG. 6A where the microsphere is treated with a sol or sol gel, e.g., silica sol gel, or other dispersions of colloidal particles and again fired at elevated temperature to deposit in the interconnecting voids and on the surfaces of the particles that form the interconnecting voids of the microsphere wall small solid particles 49, e.g., silica particles. The sol or sol gel composition can be deposited in a layer in the outer portion of the microsphere wall, in the center portion, in the inner portion of the microsphere wall or throughout the microsphere wall. The solid particles from the sol or sol gel are deposited and adhere to the surfaces of the particles that form the interconnecting voids 46, and the solid particles link-up and form in the interconnecting voids a porous lattice work of linked up deposited sol or sol gel particles.

The porous lattice work of solid particles from, e.g., the sol or sol gel deposited in the interconnecting voids and on the surface of the particles that form the voids 46 serves to reduce the void content, i.e., the volume percent voids and the pore size of the voids in the microsphere wall, i.e., from micro pores, when a controlled smaller pore size is desired. The reduction of the pore size and the void content at the same time increase the surface area of support in the pores in those embodiments in which it is desired to deposit, impregnate or otherwise place a semipermeable membrane in the interconnecting voids and/or on the outer pore area of the microsphere wall. In a preferred embodiment of the invention, the membranes are impregnated or deposited within the microsphere wall to strengthen the adhesion of the membrane to the hollow microsphere wall and avoid lifting off of the membrane during depressuring in processes which employ pressuring and depressuring cycles.

Figure 6C:
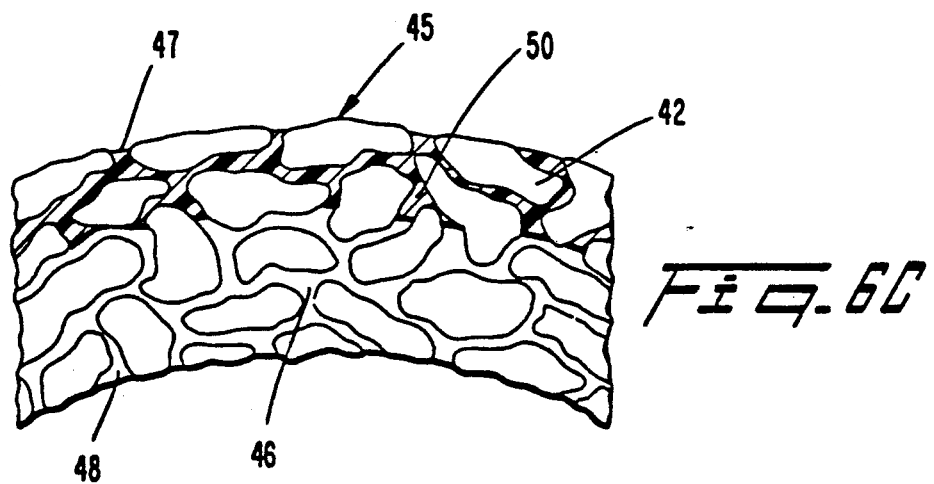

The FIG. 6C of the drawings shows a detailed cross section of the thin wall of the hollow microsphere of FIG. 6A in which the pores in the wall of the hollow microsphere are treated and impregnated and sealed with a semipermeable membrane 50. The semipermeable membrane is impregnated, deposited or otherwise placed in the microsphere wall through surface pores 47 and into voids or interconnecting channels 46, closing pores 47 and forming a discontinuous thin film 50 in the wall of the hollow microsphere.

Figure 7C:
Figure 7B:
Figure 7A:
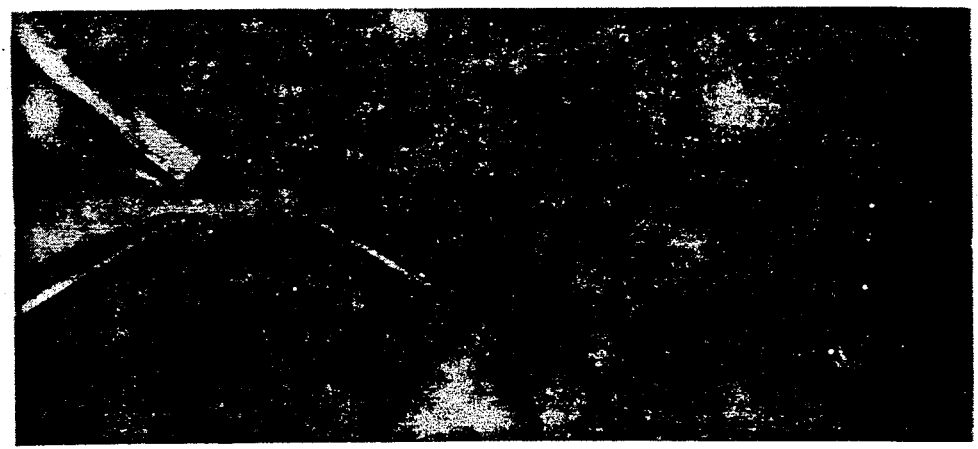

The FIG. 7A is a photograph of an embodiment of the invention illustrated in FIG. 4 and generally following the procedure described in Example 1 in which hollow green microspheres are made using a transverse jet entraining fluid and shows the breaking away of the filaments connecting the microspheres. The hollow green microspheres obtained are substantially spherical in shape and have substantially uniform diameters and substantially uniform wall thickness. The hollow green microsphere shown in the photograph (FIG. 7A) has an about 2000 micron diameter and an about 20 micron wall thickness.

The FIG. 7B is a photograph of an embodiment of the invention illustrated in FIG. 2 and generally following the procedure described in Example 2 in which filamented hollow green microspheres were obtained. The hollow green microspheres shown in the photograph (FIG. 7B) have an about 4000 micron diameter and an about 40 micron wall thickness. The diameter and wall thickness are measured from a section taken through the center of the microsphere and perpendicular to a line drawn through the microsphere connecting the points at which the filaments are attached to the microsphere.

The FIG. 7C is a photograph of another embodiment of the invention illustrated in FIG. 2 in which non-filamented hollow green microspheres were obtained. The hollow green microspheres shown in the photograph (FIG. 7C) has an about 3000 micron diameter and an about 40 micron wall thickness. The diameter and wall thickness are measured from a section taken through the center of the microsphere and perpendicular to a line drawn through the microsphere connecting the points at which the filaments are attached to the microsphere.

APPARATUS

Referring to FIG. 1 of the drawings, the vessel 1 is constructed to be heated or cooled, by means not shown, and is provided with stirring means, not shown, which stirring means maintains the particles in the dispersed particle composition 2 evenly dispersed throughout the composition 2. The coaxial blowing nozzle 10b consists of an inner nozzle 5b and an outer nozzle 11. The inner nozzle 5b and outer nozzle 11 form annular space 17. The distance between the inner wall of nozzle 11 and the outer wall of nozzle 5b can be 0.050 to 0.004 (1270 to 102), preferably 0.030 to 0.005 (762 to 127) and more preferably 0.015 to 0.008 inch (381 to 203 microns). The distance between the inner wall of nozzle 11 and the outer wall of nozzle 5b is selected such that it is large enough to prevent plugging of the nozzle and to prevent any significant compaction of the dispersed solid particles, such that the viscosity of the dispersed particle composition is not significantly changed in passing through coaxial nozzle 10a.

The inside diameter of orifice 9 of the inner blowing nozzle 5b can be 0.32 to 0.010 (8130 to 254), preferable 0.20 to 0.015 (5080 to 381) and more preferably 0.100 to 0.020 inch (2540 to 508 microns). The inside diameter of orifice 13 of outer nozzle 11 can be 0.420 to 0.020 (10668 to 508), preferably 0.260 to 0.025 (6604 to 635) and more preferably 0.130 to 0.030 inch (3302 to 762 microns).

The dispersed particle composition is extruded through a gap formed between the outer edge of orifice 9 of inner nozzle 5b and the inner surface of the inner wall of outer nozzle 11, or the inner edge of orifice 13 of outer nozzle 11 (FIG. 4) whichever is smallest. The gap, i.e., smallest annular area, through which the dispersed particle composition 2 is extruded can be 0.050 to 0.004 (1270 to 102), preferably 0.030 to 0.005 (762 to 127) and more preferably 0.015 to 0.008 inch (381 to 203 microns). The minimum size of the gap is determined to some extent by the size of the dispersed solid particles, and is set large enough to prevent plugging of the nozzle. The size of the gap is set such that the desired wall thickness of the microspheres being blown and the desired diameter of the microspheres being blown is obtained.

In FIGS. 1, 2, 3A and 4 the orifice 9 of inner nozzle 5b can terminate at about the plane or a short distance above the plane of orifice 13 of outer nozzle 11. The orifice 9 can be spaced above the plane of orifice 13 at a distance of 0.001 to 0.125 (25.4 to 3175), preferably 0.002 to 0.050 (51 to 1270) and more preferably 0.003 to 0.025 inch (76 to 635 microns).

In the FIG. 3B embodiment the orifice 9 of inner nozzle 5b can be spaced a distance of 0.050 to 0.400 inch (1270 to 10160 microns) above the plane of orifice 13 of outer nozzle 11.

In the FIGS. 2, 3A and 3B embodiments relatively lower viscosities and relatively higher blowing gas feed rates tend to produce non-filamented microspheres, see FIG. 7, and relatively higher viscosities and relatively lower blowing gas feed rates tend to produce filamented microspheres.

The outside diameter of coaxial nozzle 10a is not important, except in the FIG. 4 embodiment which utilizes a transverse jet. In the FIG. 4 embodiment the outside diameter of the coaxial nozzle 10b can be 0.520 to 0.030 (13208 to 762), preferably 0.360 to 0.035 (9144 to 889) and more preferably 0.140 to 0.040 inch (3556 to 1016 microns). The transverse jet FIG. 4 embodiment has distinct process advantages over the use of a simple coaxial blowing nozzle. The transverse jet provides a controlled means for individually sealing off each microsphere at the nozzle orifice when the microsphere formation is complete. The transverse jet also provides a controlled means for rapidly removing and transporting the formed microsphere away from the nozzle orifice which allows reduction of the mass of the connecting filaments and substantial removal or prevention of thickened wall portions at the points of connection of the filaments. The transverse jet also provides controlled means, depending on the viscosity of the dispersed particle composition, e.g., low viscosities, and the linear velocity of the transverse jet entraining fluid in the area of microsphere formation, e.g., high linear velocity, for the elimination of the connecting filaments, i.e., the filaments are rapidly thinned and broken and the remaining portions of the filaments by surface tension forces are caused to flow back into the formed microsphere and be evenly distributed in the wall of the microspheres.

Further, where the other operating conditions remain the same, increasing the transverse jet velocity provides a reduction in microsphere diameter and decreasing the transverse jet velocity provides an increase in microsphere diameter.

The coaxial nozzle 10b, i.e., inner nozzle 5b and outer nozzle 11, can be made from stainless steel, platinum alloys, glass or fused alumina. Stainless steel, however, is a preferred material.

In the FIG. 4 embodiment, the transverse jet 31 is aligned to direct the flow of entraining fluid 32 over and around outer nozzle 11 in the microsphere forming region of orifice 13a on the lee side of outer nozzle 11 (coaxial nozzle 10b). The center axis of transverse jet 31 is aligned at an angle of 15° to 85°, preferably 25° to 75° and more preferably 35° to 55° relative to the center axis of the coaxial blowing nozzle 10b.

In FIGS. 1 to 4, the inner diameter of orifice 9 (9a) can be 0.10 to 1.5 times, preferably 0.20 to 1.1 times and more preferably 0.25 to 0.80 times the inner diameter of orifice 13 (13a).

In FIGS. 1, 2, 3A, 3B and 4 the proper gap between the outer edge of orifice 9 and the inner edge of orifice 13 can best be determined for a particular dispersed particle composition by extending downward the inner nozzle 5b a sufficient distance and/or with sufficient pressure to completely block-off the flow of dispersed particle composition, and to then while feeding blowing gas through inner nozzle 5b, very slowly raise the inner nozzle 5b until a stable system is obtained, i.e., until the hollow microspheres are being formed.

PROCESS CONDITIONS

The dispersed particle compositions of the present invention can be blown into hollow microspheres at temperatures of about 10° C. to 300° C., preferably 18° C. to 200° C. and more preferably 18° C. to 100° C.

For example, the dispersed particle compositions of the present invention can be blown into microspheres at about ambient temperatures, e.g., 18° to 28° C. In order to assist in drying, i.e., partial removal of continuous liquid phase from the microspheres, the composition can, prior to blowing the microspheres, be heated to temperatures of 30° to 150° C. and preferably 50° to 125° C. At temperatures above 100° C., e.g., when the continuous liquid phase is water, the vessel 1 and the area into which the microspheres are blown can be pressurized.

To assist in hardening the microspheres, thermoplastic binders may be used. When thermoplastic binders are used the dispersed particle compositions can, prior to blowing the microspheres, be heated to temperatures 30° to 300° C., preferably 50° to 200° C., and more preferably 75° to 150° C.

The dispersed particle compositions are maintained in a liquid, fluid form at the desired blowing temperature during the blowing operation.

The dispersed particle compositions at the blowing temperature are fluid and flow easily. The dispersed particle composition just prior to the blowing operation can have a viscosity of 10 to 600 poises, preferably 20 to 350 and more preferably 30 to 200 poises.

Where the process is used to make non-filamented microspheres, e.g., using the transverse jet embodiment, the dispersed particle composition just prior to the blowing operation can have a viscosity of 10 to 200 poises, preferably 20 to 100 poises, and more preferably 25 to 75 poises.

Where the process is used to make filamented microspheres, the dispersed particle composition just prior to the blowing operation can have a viscosity of 50 to 600 poises, preferably 100 to 400 poises, and more preferably 150 to 300 poises.

The dispersed particle compositions fed to the blowing nozzle can be at about ambient pressure or can be at slightly elevated pressures sufficient to provide an adequate amount of dispersed particle composition at the coaxial blowing nozzle to blow the microspheres.

The dispersed particle composition is continuously fed to the coaxial blowing nozzle during the blowing of the microsphere to prevent premature breaking and detaching of the elongated cylinder shaped dispersed particle composition liquid film as the microsphere is being formed by the blowing gas.

The blowing gas can be at about the same temperature as the dispersed particle composition being blown. The blowing gas temperature can, however, be at a higher temperature than the dispersed particle composition to assist in maintaining the fluidity of the dispersed particle composition during the blowing operation or can be at a lower temperature than the dispersed particle composition, e.g., when using thermoplastic binder material, to assist in the solidification and hardening of the hollow dispersed particle composition microsphere as it is formed. The pressure of the blowing gas is sufficient to blow the microsphere and will be slightly above the pressure of the dispersed particle composition at the orifice 13 of the outer nozzle 11. The blowing gas pressure will also depend on and be slightly above the ambient pressure external to the blowing nozzle.

The ambient pressure external to the blowing nozzle can be at about atmospheric pressure or can be at slightly elevated pressures. Where it is desired to blow, e.g., an aqueous dispersed particle composition at above ambient temperatures, or a dispersed particle composition comprising a volatile solvent at above ambient temperatures, the ambient pressure can be increased above atmospheric pressure to prevent excessive flash evaporation of the aqueous phase or of the volatile solvent phase. The ambient pressure external to the blowing nozzle will, in any event, be such that it substantially balances, but is slightly less than the blowing gas pressure.

In the embodiment of the invention illustrated in FIG. 4 of the drawings, the transverse jet inert entraining fluid which is directed over and around the coaxial blowing nozzle to assist in the formation and detaching of the hollow dispersed particle composition microspheres from the coaxial blowing nozzle can be at about the temperature of the dispersed particle composition being blown. The entraining fluid can, however, be at a higher temperature than the dispersed particle composition to assist in maintaining the fluidity of the hollow dispersed particle composition microsphere where a thermoplastic binder is used or to assist in drying, e.g., partial removal of the continuous liquid phase during the blowing operation. The entraining fluid can alternatively be at a lower temperature than the dispersed particle composition to assist in the stabilization of the forming film and the solidification and hardening of the hollow dispersed particle composition microsphere as it is formed where the binder is a thermoplastic material.

The transverse jet entraining fluid which is directed over and around the coaxial blowing nozzle to assist in the formation and detaching of the hollow dispersed particle composition microsphere from the coaxial blowing nozzle can have a linear velocity in the region of microsphere formation of 1 to 120 ft/sec (0.3 to 3.0 m/sec), preferably 5 to 80 ft/sec (1.5 to 24 m/sec) and more preferably 10 to 60 ft/sec (3.0 to 18 m/sec).

Where the process is used to make non-filamented microspheres, the linear velocity of the transverse jet entraining fluid in the region of microsphere formation can be 30 to 120 ft/sec (12 to 37 m/sec), preferably 40 to 100 ft/sec (12 to 30 m/sec), and more preferably 50 to 80 ft/sec (15 to 24 m/sec).

Where the process is used to make filamented microspheres, the linear velocity of the transverse jet entraining fluid in the region of microsphere formation can be 1 to 50 ft/sec (0.3 to 15 m/sec), preferably 5 to 40 ft/sec (1.5 to 12 m/sec) and more preferably 10 to 30 ft/sec (3.0 to 9.0 m/sec).

The distance between the filamented microspheres depends to some extent on the viscosity of the dispersed particle composition and the linear velocity of the transverse jet entraining fluid.

The hollow dispersed particle composition microspheres after formation may be contacted with heated ambient air to assist in removal of continuous liquid phase and drying and hardening the microspheres, e.g., when an aqueous or volatile solvent continuous phase is used. The microspheres after they are formed to assist in removal of continuous liquid phase can be dropped through a heated "shot tower" and collected at the bottom of the tower in a liquid bath or on an air cushion.

The hollow microspheres after formation may be contacted with a quench fluid, e.g., cooled ambient air or an immiscible liquid spray to assist in hardening the microspheres, e.g., when a thermoplastic binder is used. The hardened microspheres can be collected on an air cushion, moving belt or in a fluidized bed. The cooling or quench fluid should be at a cold enough temperature to rapidly cool and harden the microspheres, such that they are not significantly deformed in subsequent handling.

The hollow green microspheres can optionally be treated by additional drying at slightly elevated temperatures to cure, further harden and further strengthen the binder.

Where an aqueous or volatile solvent continuous liquid phase is used the further treatment can be carried out at a temperature of 40° to 200° C., for 0.5 to 10 minutes, preferably 60° to 140° C., for 1.0 to 8.0 minutes and more preferably at a temperature of 80° to 120° C. for 2.0 to 6.0 minutes.

The hardened hollow green microspheres are then treated or fired at substantially elevated temperatures to remove the continuous liquid phase and volatile materials from the hollow microspheres.

The firing at elevated temperatures removes, for example, the binder, surface active agent, dispersing agent and remaining continuous liquid phase from the interstices between the dispersed solid particles in the dispersed particle composition from which the microspheres were formed and creates the porous characteristics of the hollow microspheres. Because continuous phase and for example the binder fill the interstices between the particles in the dispersed particle composition the removal of the continuous phase and binder result in obtaining interconnecting voids in the walls of the hollow microspheres which are continuous from the outer wall surface of the hollow microspheres through and extending to the inner wall surface of the hollow microspheres.

The firing of the microspheres also causes the particles of the dispersed particle composition to sinter at the points of contact of the particles with each other such that the particles coalesce to form a strong rigid latticework hollow microsphere wall.

The temperature at which the treatment or firing at elevated temperature is carried out depends on the particular material comprising the dispersed solid particles. The treatment or firing temperature is below the melting and softening temperature of the material comprising the dispersed solid particles and below the temperature that would cause collapse of the hollow microspheres. Where glass or metal glass particles are used to form the dispersed particle composition, the firing temperature is below the melting temperature of the glass and below the devitrification temperature of the metal glass particles.

The time-temperature relationship of the firing step is such that the continuous phase and binder are heated and removed while at the same time the microsphere is gaining strength from the dispersed particles sintering and becoming adhered together at their points of contact.

The time-temperature relationship of the firing and sintering step will also depend to some extent on the wall thickness of the microspheres and the weight percent or volume percent solids of the dispersed solid particles in the continuous liquid phase.

The microspheres are heated at a rate such as to allow time for the permeation and removal of the volatile constituents of the continuous phase and the binder material through the pores of the walls of the microspheres without cracking or breaking the walls of the microspheres, or trapping any bubbles in the walls of the microspheres.

In the dispersed particle compositions where ceramic materials comprise the dispersed particles, the firing step can, for example, be carried out at temperatures of 800° to 2000° C., for 0.5 to 180 minutes.

In the dispersed particle compositions where glass particles comprise the dispersed particles, the firing step can, for example, be carried out at temperatures of 600° to 1600° C., for 0.5 to 120 minutes.

In the dispersed particle compositions where metal particles comprise the dispersed particles, the firing step can, for example, be carried out at temperatures of 150° to 1600° C., for 0.5 to 120 minutes.

In the dispersed particle compositions where metal glass particles comprise the dispersed particles, the firing step can, for example, be carried out at temperatures of 150° to 1200° C., for 0.5 to 60 minutes.

In the dispersed particle compositions where plastic particles comprise the dispersed particle composition, the firing step is carried out at temperatures below the melting and decomposition temperatures of the plastic particles. The firing step can, for example, be carried out at temperatures of 60° to 300° C., for 0.5 to 60 minutes.

The dispersed particle composition microspheres are formed at a rate of 5 to 1500, preferably 10 to 800 and more preferably 20 to 400 per second.

The above mentioned firing temperatures and firing times for the various mentioned dispersed particles are given only as illustrative and higher or lower temperatures and longer or shorter firing times can be used as required.

An important feature of the process of the present invention is that under a specified set of operating conditions each microsphere as it is formed is of substantially the same size, shape and wall thickness and the same porosity, i.e., void content and void distribution as the preceding and following microspheres.

BLOWING GAS

The hollow dispersed particle composition microspheres can be blown with a reactant gas or an inert gas. Suitable blowing gases are argon, xenon, carbon dioxide, oxygen, hydrogen, nitrogen and air. The blowing gases are preferably dried before use.

The blowing gas can be selected to react with the continuous liquid phase, the binder or dispersed particles. The blowing gas can be selected to assist in the hardening of the dispersed particle composition, for example, by dehydrating the blowing gas to assist in drying. The blowing gas can be heated to assist in drying the hollow microspheres. The blowing gas can be selected to react with the binder material to increase the rate of hardening and strengthening of the binder material. The blowing gas can also act as or can contain a catalyst to assist in the hardening and/or curing of the binder material.

DISPERSED PARTICLES COMPOSITION

The dispersed particle film forming compositions of the present invention can comprise dispersed particles, a binder, a film stabilizing agent, a dispersing agent and a continuous liquid phase.

The dispersed particles may be partially dissolved in the continuous liquid phase and partially solid, or can be substantially solid in the continuous liquid phase.

The continuous liquid phase can be aqueous or non-aqueous and may act as a solvent for the binder material, film stabilizing agent and dispersing agent. Aqueous continuous liquids include water and non-aqueous continuous liquids include conventional organic solvents.

The disperse particle composition can contain constituents which naturally form a stable thin film and stable thin film wall hollow microsphere. However, if such is not the case a film stabilizing agent is added. The conventional foam stabilizing agents can be used as film stabilizing agents.

The dispersed particle composition may naturally form a stable dispersions of particles. Whether or not this occurs depends to some extent on the dispersed particle size and the affinity of the dispersed particles for the continuous liquid phase and the presence of residual charges on the particles' surfaces. Usually a dispersing agent is added, particularly where the particles are relatively large, e.g., above 0.10 micron.

The dispersed particles can be ceramic particles, glass particles, metal particles, metal glass particles, and plastic particles. The dispersed particle composition can also have added thereto combustible, vaporizable or meltable macro particles. The addition of the macro particles allows creating in the microsphere wall, uniform size and uniformly distributed macro pores of a predetermined and preselected size. The macro particles are subsequently removed to obtain controlled size macro pores in the walls of the hollow microspheres.

Grain growth inhibitors, such as MgO can optionally be added to the dispersed particle composition where desired to control the growth of the grain size of the dispersed particles during the firing and sintering step.

Plasticizers, such as those described in the Mistler U.S. Pat. No. 3,652,378, can optionally be added, for example to the binder material, to improve the plasticity of the dispersed particle composition and the flexibility and handling properties of the hollow green microspheres.

DISPERSED PARTICLES

The dispersed particles can be selected from a wide variety of materials and can include ceramic materials (including graphite and metal oxides), glasses, metals, metal glasses and plastics, and mixtures thereof.

The dispersed particles can be 0.005 to 60 microns in size, preferably, 0.05 to 20 and more preferably 0.1 to 10 microns in size. Generally a relatively narrow particle size distribution of particles are used. The smaller particles, e.g., 0.005 to 0.1 micron range size are referred to as colloidal size particles and particles in this size range are available in the form of sols or sol gels or sol or sol gel precursor materials, or colloidal powders. Dispersed particle compositions made from sol or sol gel materials, depending on the affinity of the colloidal size particle for the continuous liquid phase and the particles having a charged surface can form a stable dispersion without an added dispersing agent. Further, where the sol or sol gel materials are used for the dispersed particle composition on forming the hollow microsphere and removal of a portion of the continuous liquid phase, the particles can link up into a rigid or relatively rigid latticework, without the addition of separate binder material, to form a hollow green microsphere, e.g., a gel. The gel structure in this instance acts as the binder material. However, under usual conditions and for ease of handling the hollow green microspheres a binder material is added to the dispersed particle composition.

Sol gel materials can be used to make hollow microspheres by reversibly converting the gel before the blowing step to a sol by applying vibration, stirring or subjecting the gel to a high sheer force, for example, by causing it to flow under pressure through the coaxial nozzle. On issuing from the orifice of the coaxial nozzle the sol forms the hollow microsphere and subsequently due to the absence of the applied vibration, stirring or sheer forces rapidly reverts to the gel to form a hollow green microsphere.

The colloidal size particles when used as the dispersed particles can be purchased as sol dispersions or gels or as colloidal powders or can by conventional means be formed in situ just before or just after blowing the hollow microspheres, for example by chemical means from sol or sol gel precursor materials.

The dispersed particle compositions can comprise the following ingredients in weight percent based on total composition. The dispersed solids and macro particles are also given in volume percent.

TABLE I

| | Weight Percent | | |
|---|---|---|---|
| | Broad | Preferred | More Preferred |
| Dispersed Solids | 20 to 90 | 40 to 90 | 70 to 90 |
| Dispersed Solids (Vol. %) | (20 to 80) | (30 to 70) | (40 to 60) |
| Macro Particles (Vol. % Solids) | (0.5 to 20) | (1 to 10) | (2 to 6) |
| Continuous Liquid Phase | 10 to 50 | 10 to 30 | 10 to 20 |
| Binder Material | 0 to 15 | 0.1 to 10 | 0.1 to 6 |
| Film Stabilizing Agent | 0 to 2.0 | 0.05 to 0.5 | 0.1 to 1.0 |
| Dispersing Agent | 0 to 2.0 | 0.05 to 1.5 | 0.1 to 1.0 |

The volume percent solids in the dispersed particle composition is an important parameter of the composition. Where uniform size spherical particles are ideally packed the maximum theoretical solids content is 74%. Where substantially uniform size spherical particles are used in a "random" packing the maximum solids loading is about 60 volume percent. In carrying out the process of the present invention using generally regular shaped particles and reasonably narrow particle size distribution, for example, in the seventy to eighty weight percent fraction of the particles, the largest particle is about 5 to 10 times larger than the smallest particle in the seventy to eighty percent fraction. Due to the manner in which the particles are obtained there are usually present a small percentage, e.g., twenty to thirty weight percent, of very small particles.

When the dispersed particles are smaller than about 0.005 micron the particles begin to assume the properties of a true solution. When the particles are larger than about 0.1 micron there is a strong tendency for the particles to separate out of the continuous liquid phase. The addition of a dispersing agent and/or continuous stirring or agitation of the dispersed particle composition will maintain the particles uniformly dispersed in the dispersed particle composition.

When colloidal size particles comprise the dispersed particles, the particles can be formed in situ either before or after the microsphere blowing step.

A readily available source of colloidal size particles are the commercially available sol gel materials, colloidal powders, the ball clays and the bentonite clays.

Further, there are now available in concentrations of 10 to 50 weight percent solids, silica sols and metal oxide sols from the Nalco Company located in Oakbrook, Ill.

Where relatively narrow particle size distribution of particles are used, though strong hollow microspheres and hollow porous microspheres can be obtained, it has been difficult to obtain uniform size openings or pore openings on the outer and inner microsphere wall surfaces. In accordance with a preferred embodiment of applicant's invention macro pore openings of predetermined uniform and precise size can be obtained. This is done by uniformly mixing with the dispersed particle composition uniform size macro particles which consist of combustible, vaporizable or meltable materials that will burn or decompose and vaporize or melt at temperatures above the blowing temperatures and below the temperatures at which the hollow green microspheres are fired and sintered.

The macro particle size is selected to be about the same or slightly larger in size than the thickness of the wall of the microsphere in which it is to create uniform size macro pores. Thus in microspheres having wall thickness of for example 5 to 400 microns or 10 to 200 microns, the macro particles would be about 5 to 400 microns or 10 to 200 microns in size, respectively, e.g., slightly larger than the wall thickness. The diameter of the macro pore can of course be made larger than the thickness of the microsphere wall if such is desired. The macro particles can be about 0.8 to 4.0 times the thickness of the microsphere wall, preferably the macro particles are 1.1 to 2.0 times the thickness of the microsphere wall, and more preferably the macro particles are 1.1 to 1.5 times the thickness of the microsphere wall. The macro particles may be added to the dispersed particle composition in an amount of about 0.50 to 20%, preferably 1 to 10% and more preferably 2 to 6% of the dispersed particles plus macro particles volume. The macro pores can be obtained without significant weakening of the microsphere wall. Where the macro particles are smaller, e.g., 0.8 times the wall thickness, when fired at elevated temperatures, the vaporization of the macro particles blows through the wall.

This embodiment allows the creation in the microsphere wall of macro pores of a predetermined size such that materials, such as living microorganisms that are of a size of, for example, 5 to 100 microns, can be given an access path into the interior of the microsphere without injury to the living microorganisms.

CONTINUOUS LIQUID PHASE

The continuous liquid phase can be aqueous or non-aqueous. The continuous liquid phase can act as a solvent for one or more of the active ingredients, for example, the binder material, the surface active agent and dispersing agent.

The aqueous continuous liquid phase can comprise water and/or water and water soluble solvents. The aqueous continuous liquid phase composition can comprise binder materials which include acrylic polymers, acrylic polymer emulsions, ethylene oxide polymer, hydroxethyl cellulose, methyl cellulose, polyvinyl alcohol and xanthan gum. (See, for example, binders disclosed in Callahan, et. al. U.S. Pat. No. 3,538,571.)

The non-aqueous continuous liquid phase can comprise organic solvents such as acetone, ethyl alcohol, benzene, bromochloromethane, butanol, diacetone, ethanol, isopropanol, methyl isobutyl ketone, toluene, trichloroethylene and xylene.

The non-aqueous continuous liquid phase can comprise binder materials which include cellulose acetate, butyrate resin, nitro cellulose, petroleum resins, polyethylene, polyacrylate esters, polymethyl methacrylate, polyvinyl alcohol, polyvinyl butyral resins, and polyvinyl chloride. (See, for example, binder materials disclosed in Park U.S. Pat. No. 2,966,719; Pauley, et. al. U.S. Pat. No. 3,324,212; and Kappes, et. al. U.S. Pat. No. 3,740,234.)

Thermoplastic organic binder materials that can be used are polyvinyl resins, e.g., polyvinyl alcohol (water- or organic solvent-soluble), polyvinyl chloride, copolymers of vinyl chloride and vinyl acetate, polyvinyl butyral, polystyrene, polyvinylidene chloride, acrylic resins such as polymethyl methacrylate, polyallyl, polyethylene, and polyamide (nylon) resins.

Thermosetting resin organic binder materials that can be used are those in the thermoplastic water- or organic solvent-soluble stage of partial polymerization, the resins being converted after or during formation of the microspheres into a more or less fully polymerized solvent-insoluble stage. Other useful resins are alkyd, polysiloxane, phenol-formaldehyde, urea-formaldehyde and melamine-formaldehyde resins.

In addition the photopolymerizable organic polymeric binder materials that can be used are disclosed in C. G. Raffey, "Photopolymerization of Surface Coatings", Wiley, 1982.

The selection of a particular thermoplastic, thermosetting or photopolymerizable binder material will depend to some extent on the solubility or dispersibility of the particular binder material in the aqueous or non-aqueous continuous phase that is to be used. Further, certain binder materials, e.g., methyl cellulose can function as a film stabilizing agent.

FILM STABILIZING AGENTS

The dispersed particle composition may contain a natural film stabilizing agent, e.g., a surface active film stabilizing agent, or where the composition exhibits insufficient microsphere wall film stability, a film stabilizing agent can be added. The conventionally used foam stabilizing agents can be used as film stabilizing agents.

A sufficient amount of film stabilizing agent is added such that when the dispersed particle composition is blown to form the microsphere a thin stable film is formed which allows the blowing and stretching of the film without breaking and the formation and detaching of the hollow microsphere. The film stabilizing agent allows sufficient time for the surface tension properties of the continuous phase of the dispersed particle composition to cause the microspheres to seek the smallest surface area, i.e., to form a spherical shape.

Film stabilizing agents such as colloidal particles of insoluble substances and viscosity stabilizers can be added to the dispersed particle composition. These types of additives can effect the viscosity of the surface film of the wall of the microsphere to stabilize the film during microsphere film wall formation. A surface active film stabilizing agent suitable for use in an aqueous continuous phase composition is lauramide diethanolamine. Anionic surface active agents such as lauryl sulfate, sodium lauryl sulfate, and ammonium lauryl sulfate can also be used. Other film stabilizing agents that can be used are diethanolamide, dihydroxy ethyl lauramide and lauric diethanolamide. The film stabilizing agent can in certain compositions also function as a dispersing agent.

DISPERSING AGENTS

Where dispersed particles are in the colloidal size range of 0.005 to 0.1 microns in size and they have an affinity for the continuous liquid phase or if they have like surface charges, they can naturally form a stable dispersion and an added dispersing agent may not be needed. Also, when the dispersed particles are formed in situ just before or just after the microsphere blowing step an added dispersing agent may not be needed.

However, for ease of handling and for maintaining the dispersed particles, particularly particles above 0.1 to 1.0 microns in size, in a stable dispersion a dispersing agent is usually added.

When the dispersed particles are smaller than about 0.005 microns the particles begin to assume the properties of a true solution. When the particles are greater than 0.1 micron there is a natural tendency for the particles to separate out of the continuous phase and a dispersing agent and/or continuous stirring of the dispersed particle composition is or are required up until just before the blowing of the hollow microspheres is carried out.

A sufficient amount of dispersing agent is added such that the dispersed particles form a stable dispersion for a period long enough to blow the microspheres and for the microspheres to form hardened hollow green microspheres.

Dispersing agents that are suitable for use with aqueous continuous liquid phase compositions are the commercially available sodium alkyl and sodium aryl sulfonic acids. Another dispersing agent that can be used is sold under the trade name Darvan-7 which is a sodium polyelectrolyte, and is available from R. T. Vanderbilt Co., 230 Park Avenue, New York, N.Y. 10017. Organic carboxylic acids and organic polycarboxylic acids, e.g., citric acid, can be added to maintain a desired pH, and function as dispersing agents.

Dispersing agents that are suitable for use with non-aqueous, e.g., organic solvent, continuous liquid phase compositions are generally those used in the ceramic industry, e.g., fatty acids (glyceryl tri-oleate), Menhaden Fish Oil (Type Z-3, sold by Jesse Young, Co.) and the commercially available benzene sulfonic acid surfactants.

The dispersing agents can also in some cases, depending on the constituents of the dispersed particle composition, function as the film stabilizing agent.

CERAMIC MATERIALS

The ceramic material from which the dispersed particle compositions of the present invention can be made are generally those that are presently known and used in the ceramic industry. Other ceramic materials, including metal oxides, that can be used as starting materials for the present invention are disclosed in Sowman U.S. Pat. No. 4,349,456. The selection of a particular ceramic material will depend on the desired properties of the hollow microspheres, the ease of processing and the availability and cost of the ceramic material or metal oxide material. For certain uses graphite particles can be used as the dispersed particle ceramic material.

The conventionally used ceramic materials such as Alumina ($Al_2O_3$), Mullite ($3Al_2O_3 \cdot SiO_2$), Cordierite ($2MgO \cdot 2Al_2O_3 \cdot 5SiO_2$), Zircon ($ZrO_2 \cdot SiO_2$), and Zirconia ($ZrO_2$) can be used. Naturally occurring clay materials such as Kaolinite, montmorillonite, illite and bentonite can also be used. The ball clay materials can also be used.

Where appropriate the ceramic materials can be ground or otherwise treated to obtain a desired particle size.

A preferred material is alumina ($Al_2O_3$) sold by Alcoa Aluminum Co. under the trade name of "A-16" and "A-17". The A-16 and A-17 trade names designate two grades of alumina differing slightly in purity and particle size.

The particle size and particle distribution of a commercially available alumina suitable for use as dispersed particle materials is as follows:

| Size Range (microns) | Fraction Within Size | Effective Size (microns) |
| --- | --- | --- |
| 0–0.1 | 0.08 | |
| 0.1–0.3 | 0.28 | 0.20 |
| 0.30–0.6 | 0.43 | 0.45 |
| 0.6–1.0 | 0.15 | 0.80 |
| 1.0–1.5 | 0.05 | 1.25 |
| 1.5–3.0 | 0.03 | 2.0 |

The heating to fire and sinter the ceramic particles is carried out at elevated temperatures sufficient to cause the particles to sinter together at their points of contact and will depend on the properties of the particular ceramic materials treated. Where materials such as graphite are fired they are fired in a reducing atmosphere, or a non-oxidizing atmosphere and at a temperature at which the graphite particles at the points in which they are in contact sinter together.

GLASS MATERIALS

The constituents of the glass material from which the dispersed particle compositions of the present invention are made can be widely varied to obtain the desired physical characteristics of the hollow glass microspheres. The constituents of the glass compositions can be selected to form hard hollow porous microspheres which are capable of contacting adjacent microspheres without significant wear or deterioration at the points of contact. The constituents of the glass particles, depending on their intended use, can be synthetically produced glasses or naturally occurring glasses. The constituents of the glass can be selected and blended to have sufficient strength when hardened and solidified to support a substantial amount of weight.

Naturally occurring glass materials such as basaltic mineral compositions can also be used. The use of these naturally occurring glass materials can in some cases substantially reduce the cost of the raw materials used. The glass materials disclosed in applicant's U.S. Pat. No. 4,303,431 can be used as starting materials.

For low cost production it is advantageous to use waste glass, e.g., cullet or glass derived from refuse. In certain embodiments, use is made of high silica glass, such as ordinary soda-lime glass. In other embodiments, an ordinary silicate glass is used. The particular glass selected, however, will be largely determined by the proposed end use of the hollow glass microsphere. For example, where the glass microspheres are to be used as filler materials, then the low cost glass, such as waste glass can be used.

The glass materials disclosed in the De Vos U.S. Pat. No. 4,059,423 can also be used in the present invention. Where appropriate the glass materials can be ground or otherwise reduced in size to obtain a desired particle size.

The heating to fire and sinter the glass particles is carried out at elevated temperatures sufficient to cause the particles to sinter together at their points of contact and will depend on the properties of the particular glass materials treated.

Mixtures of relatively low temperature melting glass and relatively high temperature melting glass particles can be used to advantage. The low melting glass during sintering dissolves partially into the high melting glass particles, thereby allowing their fusion at the contact points at temperatures lower than the softening temperature of the high melting glass.

METAL MATERIALS

The process of the present invention can be used to form hollow microspheres from dispersed metal particles such as iron, steel, nickel, gold, copper, zinc, tin, tungsten, lead, aluminum and magnesium and the like, and mixtures thereof. The metals disclosed in the Schmitt U.S. Pat. No. 3,264,073 and in Farnand U.S. Pat. No. 3,674,461 can be used as starting materials in the present invention.

Where appropriate the metals can be ground or otherwise reduced in size to obtain a desired particle size.

The heating to fire and sinter the metal particles is carried out at elevated temperatures sufficient to cause the particles to sinter together at their points of contact and will depend on the properties of the particular metals treated. Where certain metal materials are used as the dispersed particles the firing and sintering step can be carried out in a reducing or non-oxidizing atmosphere.

METAL GLASS MATERIALS

The term metal glass(es) as used herein is intended to mean the metal alloy materials and compositions which on rapid cooling from a temperature above their liquidus temperature to a temperature below their glass temperature can form amorphous solids.

The term liquidus temperature as used herein is defined as the temperature at which the liquid and crystal phases of a metal alloy composition can exist in equilibrium, that is the temperature at which the crystalline phase can first appear when the liquid is cooled.

The term glass temperature as used herein is defined as the temperature at which the configuration of the metal alloy atoms become frozen in an amorphous solid state.

Many of the known metal glass alloy compositions have liquidus temperatures within the range of 900° C. to 1200° C. and glass temperatures within the range of 300° C. to 500° C. depending on the constituents of the compositions.

There are a wide variety of metal glass alloy compositions which can be used in accordance with the process of the present invention to make hollow porous metal glass microspheres. The metal glass alloys compositions have been broadly described as (1) metal-metalloid alloys, (2) transition metal alloys and (3) simple metal alloys. The known metal glass alloy compositions include precious metal alloys, alkaline earth metal alloys, rare earth metal alloys and actinide metal alloys.

The dispersed metal glass particles can be made from the metal glass alloy materials disclosed in the applicant's U.S. Pat. No. 4,415,512.

Where appropriate the metal glass materials can be ground or otherwise reduced in size to obtain the desired particle size.

The hardened hollow green microspheres obtained from the blowing step are subsequently heated to a temperature sufficiently high to fire and sinter the metal glass particles together. The temperature used, however, is not high enough to melt or high enough to devitrify the metal glass particles and will depend on the properties of the metal glass material treated.

In addition low melting temperature non-metal glass particles may be added to dissolve into and thereby partially fuse the metal glass particles to produce a matrix at temperatures below the glass transition temperatures.

The metal glass microspheres can, for example, be rapidly heated to temperatures to fire and sinter the particles, followed by rapid quenching in a manner which avoids devitrification. The heating step, however, is carried out in a manner such that the continuous phase and binder are allowed to permeate out of the walls of the hollow green microspheres without cracking the walls or leaving any bubbles trapped in the walls.

PLASTIC MATERIALS

The plastic materials that can be used are those disclosed in applicant's U.S. Pat. No. 4,303,603. Other plastic materials that can be used are nylon, latex particles and aqueous dispersions of TEFLON (PTFE).

Plastic particles of the desired particle size can, for example, be obtained by comminutting the plastic material or otherwise treating the plastic material to reduce its size.

The heating to fire and sinter the plastic particles is carried out at temperatures below the decomposition temperatures of the plastic particles and is carried out at elevated temperatures sufficient to cause the particles to sinter together at their points of contact and will depend on the properties of the plastic materials treated.

MACRO PARTICLES

The macro particles are selected to be of uniform size and generally spherically or spheroid in shape with preferably smooth wall surfaces.

The particles are generally solid and made from combustible, decomposable, vaporizable or meltable materials. The meltable materials when heated will melt and spread to the adjacent particles. The macro particle material is selected such that it remains solid at the blowing and microsphere hardening temperatures and is removed at temperatures below the temperatures at which the firing and sintering step is carried out. Suitable materials for use as macro particles are carbon, naphthalene, anthracene, camphor, polyformaldehyde resins, and polyethylene, polypropylene and nylon beads or pellets. Various organic polymeric materials that meet the above criteria can also be used. In addition, relatively low melting temperature metals and glasses can be used as the macro particles.

The macro particles can comprise 0.50 to 20 percent by volume, preferrably 1 to 10 percent by volume, and more preferrably 2 to 6 percent by volume of the volume of dispersed solid particles plus macro particles.

DESCRIPTION OF THE HOLLOW MICROSPHERES

The hollow green microspheres and hollow porous microspheres made in accordance with the present invention can be made from a wide variety of film forming dispersed particle compositions, particularly dispersed ceramic, glass, metal, metal glass and plastic particle compositions and mixtures thereof. The dispersed particle compositions comprise an aqueous or non-aqueous continuous liquid phase and have the necessary viscosities when being blown to form stable films. The hollow microsphere stable film wall after the microsphere is formed rapidly changes from liquid to solid to form hollow green microspheres. The hollow green microspheres can be substantially spherical in shape and can be substantially uniform in diameter and wall thickness.

The hollow green microspheres as they are being formed and/or after they are formed can have a portion of the continuous liquid phase removed from the dispersed particle composition from which the microspheres were formed. The removal of continuous liquid phase can act to bring the dispersed particles closer together and into point to point contact with each other. The dispersed particles can then link up with each other to form a rigid or relatively rigid lattice work of dispersed particles which particles lattice work with the binder (if one is used) and continuous liquid phase (that remains) comprise the hollow green microspheres.

The hollow green microspheres are free of any latent solid or liquid blowing gas materials or latent blowing gases. The walls of the hollow green microspheres are free or substantially free of any holes, relatively thinned wall portions or sections, trapped gas bubbles, or sufficient amounts of dissolved gases to form bubbles.

The term "latent" as applied to latent solid or liquid blowing gas materials or latent blowing gases is a recognized term of art. The term latent in this context refers to blowing agents that are present in or added to glass, metal and plastic particles. In the prior art processes the glass, metal and plastic particles containing the "latent blowing agent" are subsequently heated to vaporize and/or expand the latent blowing agent to blow or "puff" the glass, metal or plastic particles to form microspheres.

In applicant's invention the hollow green microspheres, because the walls are substantially free of any holes, thinned sections, trapped gas bubbles, and/or sufficient amounts of dissolved gases to form trapped bubbles, are substantially stronger than the hollow green microspheres heretofore produced.

The hollow green and hollow porous microspheres contain a single central cavity, i.e., the single cavity is free of multiple wall or cellular structures. The walls of the hollow green and hollow porous microspheres are free of bubbles, e.g., foam sections.

The hollow green and hollow porous microspheres can be made in various diameters and wall thickness, depending upon the desired end use of the microspheres. The microspheres can have an outer diameter of 200 to 10,000 microns, preferably 500 to 6000 microns and more preferably 1000 to 4000 microns. The microspheres can have a wall thickness of 1.0 to 1000 microns, preferably 5.0 to 400 microns and more preferably 10 to 100 microns.

When the dispersed particles are sintered, the smaller particles can be dissolved into the larger particles. The sintered particles in the hollow porous microspheres can be generally regular in shape and have a size of 0.1 to 60 microns, preferably 0.5 to 20 microns, and more preferably 1 to 10 microns.

The porous microspheres depending on their use, for example, as a substrate for catalyst or separation or biotech membranes, can have diameters of 1200 to 6000 microns and wall thicknesses of 10 to 200 microns, and preferably diameters of 2000 to 4000 microns and wall thicknesses of 20 to 100 microns.

The hollow green microspheres can, depending on the volume percent of dispersed solids used in forming the dispersed particle composition can shrink a small degree during the high temperature firing step. Shrinkage, however, is primarily in wall thickness rather than diameter. The shrinkage is more evident when relatively low volume percent dispersed particle compositions are used to form the hollow microspheres.

The porosity, diameter and wall thickness of the hollow porous microspheres will effect the average bulk density of the microspheres. The porous ceramic, glass, metal, metal glass and plastic microspheres prepared in accordance with the invention will have an average bulk density of 1 to 150 $lb/ft^3$, (0.020 to 2.4 gm/cc), preferably 2.0 to 60 $lb/ft^3$, (0.030 to 0.95 gm/cc), and more preferably 4 to 20 $lb/ft^3$, (0.060 to 0.32 gm/cc).

Where the microspheres are formed in a manner such that they are connected by continuous thin filaments, that is they are made in the form of filamented microspheres, the length of the connecting filaments can be 1 to 40, usually 2 to 20 and more usually 3 to 15 times the diameter of the microspheres. The diameter, that is the thickness of the connecting filaments, can be 1/5000 to 1/10, usually 1/2500 to 1/20 and more usually 1/100 to 1/30 of the diameter of the microspheres.

In certain embodiments of the invention, the ratio of the diameter to the wall thickness, and the conditions of firing and sintering the hollow microspheres can be selected such that the microspheres are flexible, i.e., can be deformed a slight degree under pressure without breaking.

The preferred embodiment of the invention, particularly with the ceramic materials, is to select the ratio of the diameter to wall thickness and the conditions of firing and sintering the hollow porous microspheres such that rigid hollow porous microspheres are obtained.

The fired hollow porous microspheres of the present invention can have a distinct advantage of being rigid, strong and capable of supporting a substantial amount of weight. They can thus be used to make simple inexpensive self-supporting or load bearing structural systems for carrying out gas or liquid separation or pharmaceutical and chemical processes.

Other uses of the hollow porous or non-porous microspheres are as filler materials and proppants.

The porosity or voids content of the walls of the hollow microspheres is dependent upon the volume percent of dispersed solids of the entire dispersed particle composition and the firing and sintering temperature.

The porosity of the walls, i.e., the void content, of the hollow fired microspheres can be 5% to 45%, preferably 15% to 35% and more preferably 20% to 30% by volume of the microsphere wall.

In applications in which a porous hollow microsphere is not needed or wanted the firing step can be carried out at sufficiently high temperatures and firing times to close off and seal the interconnecting void structure in the microsphere wall. This treatment step can be carried out in a manner so that it does not collapse the microsphere wall interconnecting void structure, such that the microspheres retain their size, shape and low density.

The hollow microspheres produced using the transverse jet embodiment of the invention are substantially spherical and have substantially uniform diameters and wall thickness.

The hollow microspheres that are produced without the use of an external fluctuating pressure field, e.g., without the use of the transverse jet entraining fluid, can be substantially spherical and can have substantially uniform diameters or they can have thickened wall portions on opposite sides of the microspheres at the points at which the filaments are connected. The thickness of the thickened portions depends in part on the viscosity of the dispersed particle composition, the rate of hardening, the distance away from the coaxial blowing nozzle when they harden and the ability of the surface tension properties of the dispersed particle composition to absorb and distribute in the wall of the microsphere the portions of the dispersed particle composition that form the filaments.

The preferred hollow microspheres are the substantially spherical microspheres. However, in some applications the hollow microspheres with the thickened wall portions can also be used. The thickened wall portions, in the area of the points at which the filaments are attached, can be 1.01 to 2.0 times the microsphere wall thickness; can be 1.1 to 1.5 times the microsphere wall thickness; and can be 1.2 to 1.3 times the microsphere wall thickness. The cross section of the microsphere other than the thickened wall portion section is substantially spherical and of substantially uniform wall thickness. All the microspheres produced under a given set of operating conditions and dispersed particle composition constituents are substantially the same in sphericity, wall thickness, void content and void distribution. A specific advantage of the process of the present invention is that in the production of hollow microspheres, the preceeding and the following microspheres that are produced are substantially the same.

The lower viscosity dispersed particle compositions tend to produce the more spherical microspheres and the higher viscosity dispersed particle compositions tend to produce microspheres with thickened wall portions at opposite ends of the hollow microspheres.

The hollow porous microspheres produced in accordance with the present invention, depending in part on the dispersed particle size, e.g., 0.1 to 3.0 microns, and dispersed particle size distribution, volume percent solids used and firing temperatures, can contain interconnecting voids or channels between the sintered particles in which the distance between particles, can be, for example, 1 to 5 microns. In order to obtain a more controlled and more uniform pore size the hollow porous microspheres can be treated to fill or partially fill and seal the interconnecting voids in the walls of the microspheres with a sol gel, i.e., a dispersed particle composition of colloidal size particles dispersed in a liquid phase. The hollow microspheres are again fired to sinter the colloidal size particles in the interconnecting voids. The colloidal size particles on firing link up to form a rigid latticework of particles across the interconnecting voids, sinter to the surface of the particles forming the interconnecting voids and the firing removes the liquid phase from the colloidal dispersed particles.

The forming of a porous rigid latticework of sintered colloidal size particles in the interconnecting voids changes the relatively large irregular pore size of the interconnecting voids to relatively uniform size micro pores of the sintered colloidal size particles. This embodiment of the invention allows the selection of a particular material and particle size to form the hollow microsphere and the selection of a different particle material (colloidal particle) and particle size to form the controlled small micro pores. In this manner the strength of the microspheres can be maximized (large particles) and at the same time the desired size of the small micro pores can be obtained (small particles).

The hollow porous microspheres can be treated with the dispersed particle composition of colloidal size particles to fill the interconnecting voids in the walls to the complete thickness of the walls, to only the top portion of the walls, e.g., the top third, the middle portion of the walls, e.g., the middle third, or the inner portion of the walls, e.g., the inner third of the thickness of the wall of the microsphere.

The micro pore structure provides a surface on or in which semipermeable membranes, enzymes, liquid membranes and catalysts can be placed or deposited.

In another application where it is desired to have maximum wall strength the heating at elevated temperatures can be carried out at temperatures high enough to melt the dispersed particles, to fuse the pores closed, to fuse the interconnecting voids closed and to remove substantially all of the interconnecting void structure from the walls of the hollow microspheres. The heating at elevated temperatures is carried out at temperatures high enough for the air or other gas in the interconnecting voids to dissolve in the fused dispersed particles or to form bubbles and migrate to the surfaces of the microspheres and out of the walls of the microspheres.

Alternatively, microspheres may be treated to have the interconnecting voids filled and sealed with a dispersion of colloidal size particles that have a lower melting temperature than the dispersed particles in the hollow porous microspheres and the dispersion of colloidal size particles, then heated and fused to seal the interconnecting voids.

Without intending to be limiting but rather to be used as a point of reference the Table II below provides exemplary relationships between the outer diameters of the microspheres, microsphere wall thickness, dispersed particle size, and ratio of the microsphere wall thickness to the outside diameter of the microsphere.

TABLE II

|  | Broad | Preferred | More Preferred |
| --- | --- | --- | --- |
| Diameter (microns) | 200 to 10000 | 500 to 6000 | 1000 to 4000 |
| Wall thickness (microns) | 1.0 to 1000 | 5.0 to 400 | 10 to 100 |
| Dispersed particles (microns) | 0.005 to 60 | 0.05 to 20 | 0.1 to 10 |
| Macro particles (microns) | 1.0 to 1000 | 5.0 to 400 | 10 to 100 |
| Ratio of wall thickness to outside microsphere diameter | 1:4 to 1:500 | 1:10 to 1:300 | 1:20 to 1:200 |

In certain embodiments of the invention, for example, where the hollow microspheres are used as catalyst supports or to contain catalyst, in biotech processes, in chemical separation processes and as filler materials, the hollow microspheres can have the dimensions shown below in Table III.

TABLE III

|  | Preferred | More Preferred |
| --- | --- | --- |
| Diameter (microns) | 1200 to 6000 | 2000 to 4000 |
| Wall thickness (microns) | 10 to 200 | 20 to 100 |
| Dispersed particles (microns) | 0.05 to 10 | 0.1 to 5 |
| Macro particles (microns) | 10 to 200 | 20 to 100 |
| Ratio of wall thickness to outside microsphere diameter | 1:10 to 1:300 | 1:50 to 1:200 |
| Dispersed particles (Vol. %) | 20 to 70 | 40 to 60 |
| Macro particles (Vol. % dispersed | 1 to 10 | 2 to 6 |

TABLE III-continued

| | Preferred | More Preferred |
|---|---|---|
| particles) | | |

When use as proppants the hollow microspheres can advantageously have diameters of 500 to 2000 microns and wall thickness of 50 to 800 microns and preferably can have diameters of 600 to 1000 microns and wall thickness of 100 to 300 microns, respectively.

In a preferred embodiment of the invention alumina ($Al_2O_3$) having a particle size of 0.1 to 3.0 microns is the dispersed particle. Illustrative aqueous alumina dispersed particle compositions are given below.

TABLE IV

| Material | Function | Weight Percent |
|---|---|---|
| Alumina (0.1 to 3.0 microns) | Dispersed Particle | 70–90 |
| (Alumina) | (Volume %) | (40–60) |
| Water | Continuous Phase | 10–20 |
| Darvan-7 | Dispersing Agent | 0.1–1.0 |
| Methyl Cellulose | Binder | 0.1–6.0 |
| Lauramide Diethanolamine | Film Stabilizing Agent | 0.1–1.0 |

The following examples illustrate the preparation of hollow dispersed particle composition microspheres in accordance with the present invention which microspheres have substantially uniform porosity, i.e., void content, and uniform void distribution.

EXAMPLE 1

An aqueous dispersed particle composition is prepared having the following constituents in the amounts indicated:

| | Weight Percent |
|---|---|
| $Al_2O_3$ (0.10 to 3.0 microns) | 85.3 |
| (Volume Percent $Al_2O_3$) | (59.0) |
| Kelzan[1] (Xanthane Gum) (Binder) | 0.16 |
| Darvan-7[2] (Dispersing Agent) | 0.30 |
| Citric Acid (Dispersing Agent) | 0.04 |
| Lauramide Diethanolamine (Film Stabilizing Agent) | 0.10 |
| Water | 14.7 |

[1]Sold by Kelco Company, 20 N. Wicker Drive, Chicago, Illinois.
[2]Sold by R. T. Vanderbilt Co., 30 Winfield Street, Norwalk, Connecticut.

The dispersed particle compositions are prepared by weighing 11 grams of Kelzan, 22 grams of Darvan-7, 2.5 grams of citric acid and mixing them together with 1,000 grams of water in a polyethylene jar. There is then added to the mixture 6,000 grams of $Al_2O_3$. The dispersion is mixed by rolling in the jar on a ball mill rack at low speeds (circumferential speed 20 cm/sec.) for two to three hours. The dispersion is then allowed to sit until any entrapped air is removed. To provide the film stabilizing agent required for microsphere film stabilization during microsphere formation, 0.1 weight percent of lauramide diethanolamine is added to the dispersion. The dispersion and the film stabilizing agent are mixed by rolling in the jar at slow speed, to avoid air entrainment and foam formation, for approximately one hour.

The viscosity of the aqueous dispersion is measured just prior to introducing the composition to the embodiment of the invention illustrated in FIG. 4 of the drawings and is adjusted to about 75 to 100 poises. The viscosity is measured by a Brookfield rotating cylinder viscosimeter.

The apparatus used is equipped with a coaxial nozzle of 0.086 in. (2184 microns) ID for the outer nozzle and 0.060 in. OD (1524 microns) for the inner nozzle. Initial preparation consists of establishing 100 cc/min. of dry $N_2$ flow through the inner nozzle, loading the apparatus with 200 cc of the dispersed particle composition and having the inner nozzle fully downwardly extended. The apparatus is closed and pressurized to 5 to 6 psi (FIG. 1). The microsphere blowing is initiated by slowly retracting the inner nozzle until the composition flows at an even flow rate through the coaxial nozzle and by slowing the blowing gas flow rate to 50 to 60 cc/min.

The transverse jet linear gas velocity (FIG. 4) in the area of microsphere production is maintained at a rate of 2 to 10 feet per second (0.6 to 3.0 m/sec).

The microspheres are filamented, i.e., connected by continuous filaments. As the distance of the microsphere from the coaxial nozzle increases the sphere becomes more rounded and the diameter of the connecting filament is reduced to about 1/10 to 1/20 of the microsphere diameter. The microspheres are at this point a uniform distance apart of approximately 4 to 10 microsphere diameters. During the blowing of the microspheres, the connecting filaments are broken away by the lateral fluctuations of the filaments induced by the flow of the transverse jet entraining fluid. The filaments break away from the microspheres at the points of connection to form free falling microspheres interspaced with broken away filament pieces.

The downward falling microspheres are partially dried and hardened to form hollow green microspheres. In this example to facilitate collection of a sample of the hollow green microspheres some are collected on a rotating disc or moving belt placed a short distance (e.g., 3 to 12 inches) below the outer orifice of the coaxial nozzle. The microspheres walls, because of the short distance they are allowed to fall, are slightly flattened at the initial point of contact with the rotating disc or moving belt. In order to obtain substantially spherical microspheres additional drying time can be provided by allowing them to drop in a drying tower a sufficient distance, e.g., 6 to 16 feet, for them to become sufficiently hardened such that they are not deformed on contact. The hollow green microspheres can also be collected in water, on an air cushion or fluidized bed, and can be heated and dried to further strengthen them prior to processing them to the firing step.

The hollow green microspheres are fired and sintered at a temperature of about 1550° to 1650° C. for about one to three hours under conditions such that the continuous liquid phase and binder are removed without cracking the walls of the microspheres. The fired microspheres are examined and are found to have substantially uniform diameters of about 2,000 to 4,000 microns, and to have thin walls that are of substantially uniform thickness of about 20 to 30 microns. The sphere walls have a porosity of about 25 to 30% and uniform void content and uniform distribution of the interconnecting voids in the walls.

The surface of the microspheres appear smooth and of relatively high strength requiring in excess of 400 psi at point to point contact to break the fired microspheres.

EXAMPLE 2

The procedure of Example 1 is followed with the exception that the transverse jet of the FIG. 4 embodiment is not used and the inner coaxial nozzle $N_2$ gas flow is maintained at about 20 to 30 cc/minute. Hollow green microspheres are formed as shown in FIG. 2 which at a distance of two to three feet below the blowing nozzle are evenly spaced apart. The filamented microspheres as before are produced, but the filaments do not break away during their formation. The filaments are, however, broken away when the microspheres are collected. As before samples are collected on a rotating disc or moving belt placed a short distance (e.g., 3 to 12 inches) inches below the outer orifice of the coaxial blowing nozzle.

The microspheres are collected and separated from the broken away filaments and are fired and sintered at about 1550° to 1650° C. for about one to three hours. The fired microspheres have a diameter of about 2500 to 4000 microns and have thin walls of about 30-40 microns. The microsphere walls have a porosity of about 15 to 20% and uniform void content and void distribution.

The microspheres collected on the rotating disc are found to have slightly thickened wall portions at the points of connection of the filaments. It is found that the drying and hardening time provided by a six to twelve foot fall, away from the coaxial nozzle, allow sufficient time for the microspheres to become substantially spherical in shape and substantially uniform in diameter, i.e., distribute the thickened wall portions to the rest of the microsphere wall.

The microspheres are checked for crush strength and it is found that strong microspheres are obtained.

EXAMPLE 3

An aqueous dispersed particle composition is prepared having the following constituents in the amounts indicated:

|  | Weight Percent |
| --- | --- |
| $Al_2O_3$ (0.1 to 3.0 microns) | 84.4 |
| (Volume Percent $Al_2O_3$) | (58) |
| Methocel[1] (Binder) | 0.60 |
| Darvan-7 (Dispersing Agent) | 0.30 |
| Citric Acid (Dispersing Agent) | 0.04 |
| (Film Stabilizing Agent)[2] | — |
| Water | 14.7 |

[1] Methocel (A-15LZ), methylcellulose sold by Dow Chemical Co., Midland Michigan.
[2] The Methocel also functions in this example as the film stabilizing agent.

The dispersed particle composition was prepared in accordance with the procedure of Example 2, modified by adding 45 grams of Methocel binder and 5750 grams of $Al_2O_3$ and by pressurizing the apparatus to 15 to 20 psi. The microspheres are collected on a rotating disc or moving belt placed a short distance below the coaxial nozzle. Hollow green microspheres which have slightly thickened wall portions at the points at which the filaments are attached are recovered.

The hollow green microspheres are collected and fired at a temperature of 1500° to 1700° C. for 1 to 3 hours. The fired microspheres walls are examined and are found to have substantially uniform porosity of 25 to 30% and substantially uniform void content and void distribution. The fired microspheres are about 2500 to 3000 microns in diameter and have an approximate 20 to 25 micron wall thickness.

A section of the microspheres taken at a right angle to a line drawn along the axis of the points at which the filaments are attached shows that the microsphere walls are of substantially uniform diameter and substantially uniform wall thickness. A sample of the fired microspheres are checked and strong hollow porous microspheres are obtained.

EXAMPLE 4

The procedure of Example 3 is repeated, except that about 2 to 4% by volume of the $Al_2O_3$ particles are replaced with macro nylon particles. The macro nylon particles are smooth and are substantially spherical in shape, smooth surfaced and about 25 microns in diameter. During the mixing step the macro particles are distributed in the dispersed particle composition. The dispersed particle composition is as in Example 3 blown to obtain hollow green microspheres. The green macrospheres are collected and it is noted that there is distributed in the thin wall of the microspheres the nylon particles, i.e., the nylon particles show through the outer wall surface of the microspheres.

The hollow green microspheres are slowly heated to a temperature of 1500° to 1650° C. to fire and sinter the dispersed alumina particles. During the firing step the binder material and continuous phase and the nylon macro particles are removed. Hollow porous microspheres about 2500 microns in diameter having thin walls of about 20 microns are obtained.

The walls of the hollow porous microspheres have uniform void content and have uniformly distributed voids. The walls of the microspheres also have distributed therein macro pores which extend through the walls and are about 25 microns in size.

EXAMPLE 5

An aqueous dispersed particle composition is prepared in accordance the procedure of Example 3 with a difference that finely divided glass particles are substituted for the alumina ($Al_2O_3$). The glass particles have a particle size distribution of 1 to 10 microns with the average particle size being 5 microns. The constituents of the composition of the glass particles, in percentages by weight are $SiO_2$—65 to 75%, $Na_2O$—11 to 14%, CaO—11 to 13%, MgO—1 to 2%, $Al_2O_3$—1.5 to 3.5%. The glass particles are added to the binder and continuous phase of the dispersed particle composition in an amount to obtain approximately 70 to 80 weight percent of glass particles in the dispersion, which is about 40 to 55 volume percent of glass particles in the composition. The dispersion is mixed by rolling the jar on a ball mill rack at low speed (circumferential speed 20 cm/sec) for three hours. The composition is allowed to sit and deair.

The water content of the dispersion is adjusted with continued mixing to obtain a viscosity of about 75 to 150 poises. The microsphere blowing is initiated as before by slowly retracting the inner nozzle until the composition flows at an even rate through the coaxial nozzle while maintaining the blowing gas flow rate at 50 to 60 cc/minute. The gas pressure above the composition in the apparatus is maintained at about 10 to 15 psi. Microspheres of uniform diameter are continuously produced and at distances of about 2 to 3 feet from the coaxial nozzle are uniformly spaced apart. These microspheres as they are blown and formed are rapidly dried by contacting them with heated air at 90° C. in a tower 14 feet in height and about 6 to 12 inches in diameter. The hollow green microspheres are collected at the bottom of the tower on an air cushion, transported to a fluidized bed and further dried at a temperature of 120° to 160° C. to obtain hollow green microspheres that are substantially spherical and of substantially uniform diameter and high strength. The dried hollow green microspheres are then fired at a temperature of 600° to 800° C. for sufficient time to sinter the particles. The firing temperature is selected to be below the softening temperature of the glass particles and the glass particles sinter and coalesce into a hollow porous vitrious microsphere without any significant change in the sphericity of the microsphere or its diameter. During the firing step the binder material and continuous phase are removed leaving hollow porous glass microspheres of about 3000 to 4000 microns diameter, having thin uniform walls of about 25 to 35 microns. The microspheres on cooling are found to be of relatively high strength, to have about 25 to 35% porosity and uniform void content and void distribution, and appear to have a smooth, glassy appearance.

EXAMPLE 6

The hollow porous fired microspheres containing the 25 micron macro pores obtained in Example 4 are cleaned, sterilized and dried. The cleaned, sterilized and dried microspheres are rigid and are loaded into a centrifuge and maintained in the outer area of the centrifuge. There is then added to the centrifuge living cells or other biologically active materials suspended in a nutrient broth.

The centrifuge is turned on and operated at a sufficiently low rpm such that the cells are substantially unharmed. The living cells have an effective size of three to fifteen microns. The centrifugal force exerted on the nutrient broth causes the nutrient broth and cells to pass through the macro pores and to enter the central cavity of the hollow microspheres. Where larger size cells are used, larger macro pores are provided.

The hollow microspheres containing the living cells are removed from the centrifuge and treated with a nontoxic protective gel to impregnate and seal the macro pores and smaller pores.

The protective gel, sealed microspheres are washed and are treated with a solution which causes a selective semipermeable membrane to be deposited on the surface of the protective gel.

The microspheres containing the encapsulated cells are self-supporting and are placed in a column and maintained under conditions which allow for the growth of the enclosed cell colonies and subsequently allow for the production of biological products by the living cells.

EXAMPLE 7

The hollow porous microspheres made in Example 3 are further treated as described below to obtain hollow porous microspheres with controlled micro pores.

The hollow porous microspheres obtained in Example 3 have pore openings, i.e., distances between the sintered dispersed particles that form the interconnecting voids of about 1 to 3 microns.

The microspheres are collected and are contacted with a stable 50 weight percent colloidal particle size silica sol dispersion in water. The silica particles are about 0.05 to 0.1 microns in size and comprise about 25 to 35 volume percent of the sol. A positive pressure is applied above the liquid level of the silica sol to force the silica sol into the interconnecting voids in the walls of the hollow porous microspheres to form a layer of sol dispersion to a depth of about one third of the thickness of the microspheres walls (see FIG. 6B).

The microspheres are then cleaned, dried and fired at a temperature of about 1000° to 1200° C., i.e., below the melting temperature of the silica particles, for sufficient time to sinter the silica particles and to remove the water from the silica particles. The sintered silica particles form a rigid latticework of particles in the interconnecting voids in the microsphere walls to about the depth the sol penetrated into the microsphere wall. The removal of the continuous liquid phase and the firing and sintering of the sol dispersion results in a slight shrinkage in the thickness of the layer of the sol dispersion in the microsphere wall.

The silica particles at the points at which they are in contact with the alumina particles that form the surfaces of the interconnecting voids are partially dissolved into or sintered to the silica particles.

The sintered silica particles comprise a strong lattice work of porous silica particles with pores of a controlled 0.10 to 0.50 micron size, i.e., with micro pores. Particles of colloidal size, other than silica particles, for example alumina particles can be used in the manner described to form the micro pores.

EXAMPLE 8

A colloidal stable silica sol dispersion containing about 50 weight percent silica particles in water, e.g., about 25 to 35 volume percent, is used to make hollow porous silica microspheres. The dispersed silica particles are about 0.05 to 0.1 micron in size. There is added to the sol about 0.60 weight percent methyl cellulose binder and about 0.1 weight percent lauramide diethanolamine film stabilizing agent. About 200 cc of the sol dispersion is charged to the apparatus of Example 1.

The hollow silica microspheres are blown generally following the procedure of Example 1.

Hollow green silica particle microspheres are obtained. The hollow green microspheres are fired at a temperature of about 1000° to 1200° C. to remove the continuous phase from the hollow green silica particle microspheres and for sufficient time to sinter the particles together. Hollow porous silica particle microspheres of about 1500 to 2000 microns diameter and 20 to 25 microns wall thickness are obtained. The microsphere walls are found to have a uniform porosity of about 30 to 35% and uniform void content and void distribution.

EXAMPLE 9

Hollow fused porcelain microspheres are prepared from a dispersed particle composition having the following constituents in the amounts indicated:

| | Grams |
|---|---|
| Feldspar[(1)] | 1212 |
| Kaolin[(2)] | 1212 |
| $Al_2O_3$[(3)] | 606 |
| Kelzan (Xanthan Gum) | 5.0 |
| Darvan-7 | 15.6 |
| Citric Acid | 2.5 |

-continued

|  | Grams |
|---|---|
| Water | 1000 |

(1)The Feldspar is sold under the tradename Felex 100 Feldspar by the Feldspar Corporation, Spruce Run, North Carolina 22777.
(2)The Kaolin is sold under the tradename Velvacast by the Georgia Kaolin Company, P.O. Box 490, Dry Branch, Georgia 31021.
(3)The $Al_2O_3$ is sold under the tradename of Alcoa A-17 by the Aluminum Company of America, Pittsburgh, Pennsylvania.

The dispersed particle composition is formulated following the procedure of Example 1, except that the Feldspar, Kaolin and Alumina are premixed prior to adding them to the liquid phase.

The microspheres are blown also following the procedure of Example 1 to obtain hollow green microspheres about 2000 to 2500 microns in diameter and having a wall thickness of about 40 microns.

The hollow green microspheres are fired at a temperature of 1180° to 1275° C. for a sufficient period of time to remove the continuous liquid phase to form interconnecting voids and then fuse the interconnecting voids closed, fuse the dispersed solid particles, have the interconnecting voids form bubbles and have the bubbles migrate to the microspheres wall surfaces and out of the microspheres walls.

On cooling it is found that hollow fused wall porcelain microspheres of uniform diameter of 2000 to 2500 microns and uniform wall thickness are obtained. The walls of the microspheres are examined and are found to be about 20 microns thick, i.e., the walls have become about 50% thinner due to the fusion and removal of the interconnecting voids. The walls of the microspheres are found to be substantially free of interconnecting voids and trapped bubbles and the microspheres are found to be strong.

Hollow green microspheres, hollow porous and hollow fused microspheres can be made from ceramic, metal, metal glass and plastic particles using the methods illustrated in the foregoing examples. The particular binder materials, film stabilizing agents and dispersing agents can be varied depending on the particles used, particle size, and the use of an aqueous or non-aqueous continuous phase.

UTILITY

The hollow porous microspheres made in accordance with the present invention have many uses, including the use as membrane substrates in the manufacture of systems using selective semipermeable material membranes, polymeric membranes, metal membranes and immobilized liquid membranes in selective gas and liquid separation processes.

The hollow porous microspheres can be made to contain macro pores or micro pores. The hollow microspheres with the macro pores can be treated to encapsulate within the microspheres living microorganisms, virus or enzymes. The hollow microspheres with the micro pores can be treated to place in the walls semipermeable, polymeric, metal or liquid material membranes and can be used to carry out chemical processes and chemical separation processes.

The hollow porous microspheres can suitably be treated with catalyst materials, adsorbents, or absorbents and used to carry out petroleum and chemical processes which processes involve the use of a catalytic material, adsorbents or absorbents, either individually or in combination with selective solid or liquid membranes.

The hollow porous microspheres and microspheres that have had the pores sealed by sintering the pores closed, or by filling the pores with an organic or inorganic sealing material can be used as proppants in gas recovery processes, as filler materials or aggregates in cement, plaster, asphalt and construction broad materials.

The hollow microspheres can be bonded together by sintering or suitable resin adhesives or bonded together by suitable fusable materials and molded into sheets or other forms and used to make new light weight construction materials for use in new construction, including homes, factories and office buildings.

The hollow microspheres may be adhered together with known adhesives or binders to produce semi- or rigid cellular type materials for use in manufacturing various products or in construction. The hollow microspheres when used in manufacture of construction materials can advantageously be used alone or in combination with styrofoam, polyurethane foam, phenol-formaldehyde foam, organic and inorganic binders and the like.

The process and apparatus of the present invention as mentioned above can be used to blow hollow green microspheres from suitable film forming dispersed particle compositions having sufficient viscosity at the temperature at which the microspheres are blown to form a stable elongated cylinder shape of the dispersed particle composition being blown and to subsequently be detached to form the spherical shaped hollow microspheres and form hardened hollow green microspheres.

In carrying out the process of the present invention, the continuous liquid phase and the dispersed ceramic, glass, metal, metal glass and plastic particles, and mixtures thereof to be used to form the dispersed particle composition are selected and treated and/or mixed with a binder, dispersing agent and film stabilizing agent to adjust the viscosity and surface tension characteristics of the dispersed particle composition such that at the desired blowing temperatures the compositions are capable of forming hollow green microspheres of the desired diameter and wall thickness and sufficient hardness that the microspheres can be handled and collected without substantial breakage or deformation.

These and other uses of the present invention will become apparent to those skilled in the art from the foregoing description and the appended claims.

It will be understood that various changes and modifications may be made in the invention, and that the scope thereof is not to be limited except as set forth in the following claims.

What is claimed is:

1. Hollow porous microspheres having a substantially uniform diameter within the range of 500 to 6,000 microns and having a substantially uniform wall thickness within the range of 5.0 to 400 microns, the walls of said hollow microspheres comprise sintered together particles, said sintered together particles being selected from the group consisting of glass, metal and metal glass particles, which define interconnecting voids within the walls and a single central cavity in the interior of the microspheres and inner and outer microsphere wall surfaces, said interconnecting voids are continuous and extend from the outer wall surface to the inner wall surface, said walls have substantially uniform void content and said interconnecting voids are substantially uniformly distributed in the walls of the hollow microspheres, and the walls of said hollow microspheres are free of latent solid or liquid blowing gas materials and are substantially free of relatively thinned wall portions and bubbles.

2. The hollow porous microspheres of claim 1 wherein the walls of the hollow porous microspheres comprise sintered together glass particles.

3. The hollow porous microspheres of claim 1 wherein the walls of the hollow porous microspheres comprise sintered together metal particles.

4. The hollow porous microspheres of claim 1 wherein the walls of the hollow porous microspheres comprise sintered together metal glass particles.

5. The hollow porous microspheres of claim 2, 3 or 4 wherein the sintered together particles comprising the walls of said hollow microspheres have a particle size of 0.5 to 20 microns.

6. The hollow porous microspheres of claim 2, 3 or 4 wherein the ratio of the microspheres wall thickness to the microsphere outside diamter is 1:10 to 1:300.

7. The hollow porous microspheres of claim 2, 3 or 4 containing distributed in the walls of said microspheres macro pores which are 5 to 400 microns in size and which extend through the microspheres walls.

8. Hollow microspheres having a substantially uniform diameter within the range of 500 to 6000 microns and having a substantially uniform wall thickness within the range of 5 to 400 microns, the walls of said hollow microspheres comprise sintered together particles, said sintered together particles being selected from the group consisting of glass, metal and metal glass particles, which define voids within the walls and a single central cavity in the interior of the microspheres and inner and outer microsphere wall surfaces, said voids extend from the outer wall to the inner wall, said walls have substantially uniform void content and said voids are substantially uniformly distributed in the walls of the hollow microspheres, and the walls of said hollow microspheres are free of latent solid or liquid blowing gas material and are substantially free of relatively thinned wall portions and bubbles, wherein the sintered together particles defining the voids have been sintered or fused to close and seal the voids.

9. The hollow microspheres of claim 8 wherein the walls of the hollow microspheres comprise sintered together glass particles.

10. The hollow microspheres of claim 8 wherein the walls of the hollow microspheres comprise sintered together metal particles.

11. The hollow microspheres of claim 8 wherein the walls of the hollow microspheres comprise sintered together metal glass particles.

12. The hollow microspheres of claim 9, 10 or 11 wherein the sintered together particles comprising the walls of said hollow microspheres have a particle size of 0.5 to 20 microns.

13. The hollow microspheres of claim 9, 10 or 11 wherein the ratio of the microspheres wall thickness to the microsphere outside diameter is 1:10 to 1:300.

14. Hollow porous microspheres having a substantially uniform diameter within the range of 500 to 6,000 microns and having a substantially uniform wall thickness within the range of 5.0 to 400 microns, the walls of said hollow microspheres comprise sintered together particles which define interconnecting voids within the walls and a single central cavity in the interior of the microspheres and inner and outer microsphere wall surfaces, said interconnecting voids are continuous and extend from the outer wall surface to the inner wall surface, said walls have substantially uniform void content and said interconnecting voids are substantially uniformly distributed in the walls of the hollow microspheres, and the walls of said hollow microspheres are free of latent solid or liquid blowing gas materials and are substantially free of relatively thinned wall portions and bubbles, wherein there is contained in the interconnecting voids a rigid latticework of small solid particles such that the interconnecting voids contain a porous matrix of said small solid particles to form in the interconnecting voids micro pores defined by said rigid latticework of small particles.

15. The hollow porous microspheres of claim 14 wherein the walls of the hollow porous microspheres comprise sintered together inorganic particles.

16. The hollow porous microspheres of claim 14 wherein the walls of the hollow porous microspheres comprise sintered together ceramic particles.

17. The hollow porous microspheres of claim 14 wherein the walls of the hollow porous microspheres comprise sintered together alumina particles.

18. The hollow porous microspheres of claim 14 wherein the sintered together particles comprising the walls of said hollow microspheres have a particle size of 0.5 to 20 microns.

19. Hollow porous microspheres having a substantially uniform diameter within the range of 500 to 6,000 microns and having a substantially uniform wall thickness within the range of 5.0 to 400 microns, the walls of said hollow microspheres comprise sintered together particles which define interconnecting voids within the walls and a single central cavity in the interior of the microspheres and inner and outer microsphere wall surfaces, said interconnecting voids are continuous and extend from the outer wall surface to the inner wall surface, said walls have substantially uniform void content and said interconnecting voids are substantially uniformly distributed in the walls of the hollow microspheres, and the walls of said hollow microspheres are free of latent solid or liquid blowing gas materials and are substantially free of relatively thinned wall portions and bubbles, and having placed in the interconnecting voids in the walls of the microspheres a selective semipermeable membrane such that the interior of the hollow microsphere is closed off from the exterior of the hollow microsphere.

20. The hollow porous microspheres of claim 19 wherein the walls of the hollow porous microspheres comprise sintered together inorganic particles.

21. The hollow porous microspheres of claim 19 wherein the walls of the hollow porous microspheres comprise sintered together ceramic particles.

22. The hollow porous microspheres of claim 19 wherein the walls of the hollow porous microspheres comprise sintered together alumina particles.

23. The hollow porous microspheres of claim 19 wherein the walls of the hollow porous microspheres comprise sintered together glass particles.

24. The hollow porous microspheres of claim 19, 21, or 23 containing distributed in the walls of said microspheres macropores which are 5 to 400 microns in size and which extend through the walls of the microspheres, and having placed in the macropores in the walls of the microspheres a selective semi-permeable membrane.

25. Hollow porous microsphers having a substantially uniform diameter within the range of 500 to 6,000 microns and having a substantially uniform wall thickness within the range of 5.0 to 400 microns, the walls of said hollow microspheres comprise sintered together particles which define interconnecting voids within the walls and a single central cavity in the interior of the microspheres and inner and outer microsphere wall surfaces, said interconnecting voids are continuous and extend from the outer wall surface to the inner wall surface, said walls have substantially uniform void content and said interconnecting voids are substantially uniformly distributed in the walls of the hollow microspheres, and the walls of said hollow microspheres are free of latent solid or liquid blowing gas materials and are substantially free of relatively thinned wall portions and bubbles, and containing encapsulated therein an adsorbent or absorbent material.

26. The hollow porous microspheres of claim 25 wherein the walls of the hollow porous microspheres comprise sintered together inorganic particles.

27. The hollow porous microspheres of claim 25 wherein the walls of the hollow porous microspheres comprise sintered together ceramic particles.

28. The hollow porous microspheres of claim 25 wherein the walls of the hollow porous microspheres comprise sintered together alumina particles.

29. The hollow porous microspheres of claim 25 wherein the walls of the hollow porous microspheres comprise sintered together glass particles.

30. The hollow porous microspheres of claim 25, 27 or 29 containing distributed in the walls of said microspheres macro pores which are 5 to 400 microns in size and which extend through the microspheres walls.

* * * * *